United States Patent
Kori et al.

(10) Patent No.: US 7,248,784 B1
(45) Date of Patent: Jul. 24, 2007

(54) SIGNAL CONVERSION APPARATUS AND METHOD

(75) Inventors: Teruhiko Kori, Kanagawa (JP); Asako Fujii, Tokyo (JP); Jun Hirai, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/419,164

(22) Filed: Oct. 15, 1999

(30) Foreign Application Priority Data

Oct. 16, 1998 (JP) ............................. P10-294792

(51) Int. Cl.
*H04N 5/91* (2006.01)

(52) U.S. Cl. ........................................ 386/94; 348/458

(58) Field of Classification Search ............. 348/395.1, 348/441, 461, 572, 458; 386/94, 95, 97, 386/104, 109, 112, 131
See application file for complete search history.

(56) References Cited

U.S. PATENT DOCUMENTS

| | | | | |
|---|---|---|---|---|
| 4,685,131 A | * | 8/1987 | Horne | 725/104 |
| 5,280,397 A | * | 1/1994 | Rhodes | 386/131 |
| 5,778,064 A | * | 7/1998 | Kori et al. | 386/123 |
| 5,786,863 A | | 7/1998 | Collins | |
| 5,825,968 A | * | 10/1998 | Nishigaki et al. | 386/94 |
| 6,272,283 B1 | * | 8/2001 | Nguyen | 386/94 |
| 6,356,704 B1 | * | 3/2002 | Callway et al. | 386/94 |
| 6,374,036 B1 | * | 4/2002 | Ryan et al. | 386/94 |
| 6,567,097 B1 | * | 5/2003 | Iwaki | 348/446 |

FOREIGN PATENT DOCUMENTS

| | | |
|---|---|---|
| EP | 0 855 837 A2 | 7/1998 |
| EP | 0 860 992 A2 | 8/1998 |
| JP | 10-257428 A | 9/1998 |
| WO | WO-98/46016 A1 | 10/1998 |

* cited by examiner

*Primary Examiner*—James J. Groody
*Assistant Examiner*—James A. Fletcher
(74) *Attorney, Agent, or Firm*—Lerner, David, Littenberg, Krumholz & Mentlik, LLP

(57) ABSTRACT

When an input signal is signal-converted and is output, the copyright of a signal to be signal-converted is reliably protected. In an additional information detection/determination section, digital watermark information, CGMS information, etc., which are superposed on or added to an input luminance signal, are detected, and it is determined whether or not a signal which is to be signal-converted in a signal conversion section should be output on the basis of the detected additional information. When additional information for prohibiting or limiting copying has been superposed on or added to the input luminance signal, a switching circuit for output control is turned off so that the signal which is signal-converted in the signal conversion section is not output to the outside.

54 Claims, 11 Drawing Sheets

SIGNAL CONVERSION APPARATUS AND METHOD

BACKGROUND OF THE INVENTION

1. Field of the Invention

The present invention relates to a signal conversion apparatus and to a signal conversion method for protecting the copyright of information signals after signal conversion when, for example, an information signal, such as a video signal or an audio signal, is converted and output.

2. Description of the Related Art

Various software has come to be distributed through various types of recording media, such as video tape or DVD (digital video disk), the Internet, and broadcasting media. However, there is a problem in that software which is distributed on a large scale in this manner might be copied without limit, and various copy-prevention measures have been taken conventionally.

For example, for analog video signals, although it is not a method for directly prohibiting copying of the analog video signals, there is a method for effectively preventing copying by using a difference in methods of AGC (automatic gain control) or a difference in characteristics of APC (automatic phase control) between, for example, a VTR as a recording apparatus and a monitor receiver for providing a video.

A method that uses a difference in methods of AGC, for example, in a VTR, AGC is performed in accordance with a pseudo-synchronization signal inserted into a video signal, and in a monitor receiver, an AGC method which is not dependent on this pseudo-synchronization signal is adopted, is an example of the former case. When an analog video signal is recorded on an original recording medium, a pseudo-synchronization signal whose level is extremely high as a synchronization signal for AGC is inserted in advance, and this pseudo-synchronization signal whose level is extremely high is inserted, as a synchronization signal for AGC, into a video signal to be supplied from a playback VTR to a recording VTR.

Also, a method that uses a difference in the characteristics of the APC, for example, APC in a VTR follows a color burst signal in a video signal at a short time constant, and APC in a monitor receiver follows a color burst signal at a relatively long time constant, is an example of the latter case. When an analog video signal is recorded on an original recording medium, the phase of a color burst signal of a video signal is partially inverted in advance, and a video signal in which the phase of a color burst signal is partially inverted is output as a video signal to be supplied from a playback VTR to a recording VTR.

As a result of the above, in a monitor receiver which receives an analog video signal from a playback VTR, video is played back normally without being influenced by the pseudo-synchronization signal or the partial inversion of the phase of the color burst signal used for APC.

However, in a VTR which receives an analog video signal, to which a pseudo-synchronization signal is inserted from a playback VTR as described above or which is subjected to phase inversion control of a color burst signal, and which records this signal on a recording medium, gain control or phase control based on an input signal cannot be performed normally, and the video signal cannot be recorded normally. Therefore, even if the recorded video signal is played back, it is possible to make a normal video which can be viewed or listened to not to be played back.

When an analog video signal is handled in this manner, rather than prohibiting copying, the purpose is to produce a playback video which cannot be viewed or listened to normally, and this is a kind of passive copying prevention control.

In contrast, when digitized information, for example, a digital video signal, is handled, copying control information indicating copying prohibition or copy permission is added, as digital data, to the video signal, and is recorded on a recording medium or is transmitted, so that direct copying prevention control, such as prohibiting copying, is performed in accordance with the copying control information added to the video signal.

For example, when main digital information recorded on a recording medium having copying control information added thereto is copied to another recording medium, in a digital playback apparatus, information is read from the recording medium, the copying control information is obtained together with the main digital information, and this information is sent to a digital recording apparatus through a digital transmission path.

Then, in the digital recording apparatus, a copying control signal is detected from the information received through the digital transmission path, and the control content thereof is determined. Then, recording control of the main digital information is performed based on the determination result.

Therefore, when the determined content of the copying control indicates that the recording of the main digital information input through the digital transmission path is allowed, the input main digital information is converted into digital information suitable for recording and is written into another recording medium, thus performing recording. When, on the other hand, the determined content of the copying control indicates copy prohibition, a process for recording the input main digital information is not performed.

Also, in addition to main information being copy-prohibited or copy-permitted regardless of whether it is an analog signal or a digital signal, a copy control method of generation limitation has been conceived such that copying is permitted once, but copying from the copy is prohibited. As a copy control information method which is capable of performing this copy generation management, a CGMS (Copy Generation Management System) method and a method that uses a digital watermark process have been proposed.

A digital watermark process is a process for embedding information as noise into a portion (which is not important for human perception) present in a video signal and an audio signal, that is, a portion which is not redundant with respect to music and video. Additional information embedded into a video signal and an audio signal by such a digital watermark process is not easily removed from the video signal and the audio signal. On the other hand, even after a filtering process is performed on a video signal and an audio signal (in the case of digital information, even after a data compression process is performed thereon), it is possible to detect the additional information embedded therein from the video signal and the audio signal.

In the case of a copying control method which uses this digital watermark process, the following four states are made to represent the copy generation and the copy limitation state of a video signal and an audio signal to which the relevant digital watermark information is superposed according to the additional information to be embedded:

① "Copying is possible (Copy Free)"

② "Copying is possible once (Copying is possible for one generation) (One Copy)"

③ "Subsequent copying is prohibited (No More Copy)"

④ "Copying is absolutely prohibited (Never Copy)"

"① "Copying is possible (Copy Free)"" indicates that free copying of audio signals and video signals is possible. "② "Copying is possible once (copying is possible for one generation)"" indicates that copying of audio signals and video signals is possible once. "③ "Subsequent copying is prohibited (No More Copy)"" indicates that the relevant audio signals and video signals are copied from the audio signals and video signals in a state of ② in which copying is possible once, and subsequent copying is prohibited. "④ "Copying is absolutely prohibited (Never Copy)"" indicates that copying is absolutely prohibited.

When the digital watermark information superposed onto the video signals and audio signals is "Copying is possible once (One Copy)", a recording apparatus which supports a digital watermark process (that is, supports a copy limitation process) determines that copy recording of the video signals and audio signals is possible and performs recording, and digital watermark information replaced with the "Subsequent copying is prohibited (No More Copy)" is superposed onto the recorded video signals and audio signals. When the digital watermark information superposed onto the video signals and the audio signals to be recorded is "Subsequent copying is prohibited (No More Copy)", a recording apparatus which supports a digital watermark process determines that the copy recording of the video signals and audio signals is prohibited, and prohibits the performing of the recording.

The CGMS method is a method in which, in the case of, for example, an analog video signal, 2-bit additional information for copy control is superposed (this case is particularly called "CGMS-A") in one specific horizontal interval within a vertical blanking period of the analog video signal, and in the case of a digital video signal, 2-bit additional information for copy control is added (this case is particularly called "CGMS-D") to digital image data and is transmitted.

In the case of this CGMS method, the meaning of the 2-bit information (hereinafter referred to as "CGMS information") is as follows:

[00] . . . Copying is possible

[10] . . . Copying is possible once (copying is possible for one generation)

[11] . . . Copying is prohibited (Copying is absolutely prohibited)

In the CGMS method, there is no state for the above-mentioned "Subsequent copying is prohibited".

When the CGMS information added to the video signal is [10], a CGMS-compatible recording apparatus determines that copy recording of the video signals is possible and performs recording, and the CGMS information which is rewritten into [11] is added to the recorded video signals. Then, when the CGMS information added to the video signal to be recorded is [11], the CGMS-compatible recording apparatus determines that copy recording of the video signals is prohibited, and performing of recording is prohibited.

As described above, in order to protect the copyright of content information, such as video signals and audio signals, various copy prevention measures have been considered, and by using one or more of these measures, protection of the copyright of the content information can be ensured.

However, even in the case of main information in which a copy prevention measure such as that described above is taken, there is a case in which the copyright of the main information cannot be appropriately protected, for example, as a result of this information being subjected to signal conversion, information added to the main information signal for the purpose of the protection of copyright is lost or deteriorated, making it possible to copy main information, the copying of which is prohibited.

When, for example, an analog video signal, to which CGMS information, etc., is added in a vertical blanking period, recorded on a recording medium is read and this signal is converted into a digital video signal and output, the additional information, such as the CGMS information, added in the vertical blanking period, disappears. Therefore, in this case, even if CGMS information for prohibiting copying has been added to the original analog video signal, the digital video signal after signal conversion can be copied.

In addition, when mutual signal conversion between a high-definition television signal (hereinafter abbreviated as "HDTV") and a standard television signal (hereinafter abbreviated as "SDTV"), conversion of the number of scanning lines of a video signal, or mutual signal conversion between progressive scanning and interlaced scanning is performed, additional information added to a video signal before conversion may deteriorate in the video signal after conversion or the state of the additional information may change.

Even in such a case, as a result of the additional information added to the video signal after conversion not being accurately detected, copying of the signal after conversion may become possible despite the fact that copying of the signal before conversion is prohibited.

As described above, an apparatus for performing signal conversion becomes what is commonly called a bypass apparatus for making possible recording of a signal whose copy has been prohibited, making it impossible to appropriately protect the copyright of the content information whose copying is prohibited or limited.

For this reason, in an apparatus for performing signal conversion, there is a need to newly mount an apparatus for adding additional information used to protect the copyright to a signal after signal conversion. However, this increases the cost of the apparatus for performing signal conversion. Also, when the signal after conversion is an analog audio signal or HDTV, since the copyright protection technology for these signals has not yet been established completely, it is not possible to reliably protect the copyright of the analog audio signal and HDTV.

SUMMARY OF THE INVENTION

In view of the above, it is an object of the present invention to provide a signal conversion apparatus and a signal conversion method which are capable of reliably protecting the copyright of an input signal which is subjected to signal conversion when the input signal is converted and is output.

To achieve the above-mentioned object, according to the present invention, there is provided a signal conversion apparatus comprising: a signal conversion unit for converting an input signal to a converted signal; a determination unit for detecting additional information added to the input signal and for determining whether or not this additional information indicates a use limitation for the converted signal; and a use limitation unit for disabling the converted signal when the use limitation is copy prohibition or copy limitation.

According to the signal conversion apparatus of the present invention, when the determination unit determines that the additional information indicates copy prevention or copy-limitation, the use limitation unit disables the converted signal.

In this way, since use limitation of the signal after signal conversion is appropriately performed on the basis of the additional information, it is possible to appropriately protect the signal to be converted.

In the signal conversion apparatus of the present invention, the input signal may be a video signal, and the signal conversion unit may convert progressive scanning into interlaced scanning or interlaced scanning into progressive scanning.

According to the signal conversion apparatus of the present invention, the signal conversion unit may convert the scanning method for a video signal. For example, when the input signal is a video signal for progressive scanning, the signal conversion unit separates a video signal of one frame for the progressive scanning into a field formed of an odd number of horizontal lines and a field formed of an even number of horizontal lines and converts the video signal into a video signal for interlaced scanning. Also, when the input signal is a video signal for interlaced scanning, video signals of continuous fields which form one frame are synthesized, and a video signal for progressive scanning is formed.

As described above, even if the scanning method for the input video signal is converted, since use limitation for the video signal after signal conversion is appropriately performed on the basis of the additional information added to the video signal before signal conversion, it is possible to appropriately protect the copyright of the video signal to be converted.

In the signal conversion apparatus, the input signal may be a video signal, and the signal conversion unit may convert the number of scanning lines.

According to the signal conversion apparatus of the present invention, the signal conversion unit may convert the number of scanning lines of a video signal. For example, 525 scanning lines of an input video signal may be increased to 720 or 1080, or 1080 scanning lines of an input video signal may be decreased to 720 or 525.

In this case, when the number of scanning lines is increased, the scanning lines are interpolated, and when the number of scanning lines is decreased, the scanning lines are thinned. Even if an input video signal is converted into a video signal having a different number of scanning lines by performing interpolation or thinning of the scanning lines in this manner, use limitation for the video signal after signal conversion is appropriately performed on the basis of the additional information added to the video signal before signal conversion. This makes it possible to appropriately protect the copyright of the video signal to be converted.

In the signal conversion apparatus of the present invention, the input signal may be a video signal, and the signal conversion unit may convert a signal format.

According to the signal conversion apparatus of the present invention, conversion of the signal format of an input video signal is performed by the signal conversion unit, for example, mutual signal conversion between a high-definition television signal and a standard television signal, mutual signal conversion between a video signal of an image data format for computer processing and a television signal, conversion from an analog video signal into a digital video signal, and conversion of a compression method.

Even when the signal format of the input video signal is converted and is output in this manner, since use limitation for the video signal after signal conversion is appropriately performed on the basis of the additional information added to the input video signal before signal conversion, it is possible to appropriately protect the copyright of the video signal to be converted.

In the signal conversion apparatus, the input signal may be an audio signal.

According to the signal conversion apparatus of the present invention, use limitation of the audio signal after signal conversion may be performed by the use limitation unit on the basis of the additional information added to this input audio signal.

As a result, since the use limitation of the audio signal after signal conversion is appropriately performed on the basis of the additional information added to the input audio signal, it is possible to appropriately protect the copyright of the audio signal to be converted.

The signal conversion apparatus of the present invention may further comprise a notification unit for notifying the use limitation state of the converted signal on the basis of the determination result in the determination unit.

According to the signal conversion apparatus of the present invention, whether the signal after signal conversion is a signal which can be output or cannot be output is notified through the notification unit on the basis of the determination result in the determination unit.

As a result, when the converted signal cannot be output, the reason the signal is not output can be notified to the user of the signal conversion apparatus, making it possible to quickly notify the reason the converted signal is not output. Therefore, when the converted signal is not output, it is possible for the user not to misunderstand this as a failure of the apparatus.

In the signal conversion apparatus of the present invention, the additional information may be digital watermark information formed by digital watermark technology, and the determination unit may detect the digital watermark information, and determine whether or not the detected digital watermark information indicates copy prohibition or copy limitation.

According to this signal conversion apparatus of the present invention, it is difficult to remove or counterfeit digital watermark information superposed on the input signal, and the information is reliably supplied to the signal conversion apparatus. This digital watermark information is detected by the determination unit, and it is possible to control the output of the converted signal on the basis of the detected digital watermark information. This makes it possible to reliably and accurately protect the copyright of the signal to be converted.

In the signal conversion apparatus of the present invention, the input signal may be a digital signal, and the determination unit may detect additional information added to the digital signal and determine whether or not the detected additional information indicates copy prohibition or copy limitation.

According to the signal conversion apparatus of the present invention, when the input signal is, for example, a digital video signal, since additional information of a CGMS-D method is added to this digital video signal, the output of the video signal after signal conversion can be appropriately controlled by detecting the CGMS information. Thus, it is possible to accurately and appropriately protect the copyright of the input digital signal to be converted by using the additional information added to the digital signal.

In the signal conversion apparatus of the present invention, a plurality of different types of additional pieces of information may be added to the input signal, and when it is determined by the determination unit that one of the plurality of different types of additional pieces of information indicates copy prohibition or copy limitation, the use limitation unit disables the signal after signal conversion.

According to the signal conversion apparatus of the present invention, each of the plurality of different types of additional pieces of information added to the input signal may be detected and used for output control of the signal after signal conversion. When one of the plurality of different types of additional pieces of information indicates copy prevention or copy limitation, the converted signal is disabled.

As a result, for example, even when one piece of additional information is illegally removed or counterfeited, it is possible to reliably and appropriately control the output of the converted signal by using another piece of additional information. It is also possible to improve reliability with respect to controlling the output of the converted signal.

In the signal conversion apparatus of the present invention, one of the plurality of different types of additional pieces of information may be digital watermark information formed by digital watermark technology.

According to the signal conversion apparatus of the present invention, since it is difficult to remove or counterfeit digital watermark information, even when additional information other than the digital watermark information is illegally removed or counterfeited, the digital watermark information remains superposed on the input signal. Therefore, by using this digital watermark information, it is possible to reliably and accurately control the output of the converted signal.

In the signal conversion apparatus of the present invention, the input signal may be a digital signal provided after an encryption process is performed thereon.

According to the signal conversion apparatus of the present invention, the input signal may be an encrypted digital signal. The output of the converted signal can be accurately controlled on the basis of, for example, the CGMS information added to this digital signal, and the output of the converted signal can be controlled by taking into consideration the presence or absence of key information for decrypting the encryption and the type of the apparatus to which the converted signal is sent.

The above and further objects, aspects and novel features of the invention will become more apparent from the following detailed description when read in connection with the accompanying drawings.

DESCRIPTION OF THE PREFERRED EMBODIMENTS

An embodiment of a signal conversion apparatus and a signal conversion method according to the present invention is described below with reference to the drawings.

A signal conversion apparatus of this embodiment described below limits the use of an information signal after signal conversion in accordance with additional information added to the information signal before signal conversion when, for example, an information signal, such as a video signal and an audio signal, is subjected to signal conversion, such as converting the signal format thereof, and is output.

More specifically, the signal conversion apparatus of the embodiment described below reliably protects the copyright of, an information signal in such a way that even if, for example, copy control information added, as additional information, to an information signal before signal conversion is lost as a result of the signal conversion, the signal is output by limiting the output of the information signal after the signal conversion or by preventing normal use in accordance with the additional information added to the information signal before the signal conversion.

Therefore, a description is given assuming that when the information signal is a video signal, for example, additional information of a CGMS method (hereinafter referred to as "CGMS information"), an AGC pulse signal (pseudo-synchronization signal for copy prevention of a macro-vision method) for disabling normal use of a copied video signal by using a difference in the AGC methods, digital watermark information formed by using digital watermark technology, etc., have been added to the information signal which is signal-converted by the signal conversion apparatus according to the present invention.

Also, a description is given assuming that when the information signal is an audio signal, additional information of an SCMS (Serial Copy Management System) method (hereinafter referred to as "SCMS information"), digital watermark technology, etc., have been added thereto.

In the embodiment described below, the digital watermark information is a spectrum diffusion signal formed by using spectrum diffusion technology. This spectrum diffusion signal is formed using codes of a PN (Pseudo-random Noise) sequence (hereinafter referred to as "PN codes").

First Embodiment

A first embodiment of a signal conversion apparatus according to the present invention will first be described. In this first embodiment, a description is given by using, as an example, a case in which a signal conversion apparatus according to the present invention is used in a monitor receiver.

The monitor receiver of this first embodiment has functions as a signal conversion apparatus for receiving a luminance signal Y, color-difference signals R-Y and B-Y and for displaying a video formed by these signals on a CRT (cathode ray tube), and further, for forming a video signal of an NTSC method from the supplied signal and for outputting this signal.

Figure 1:
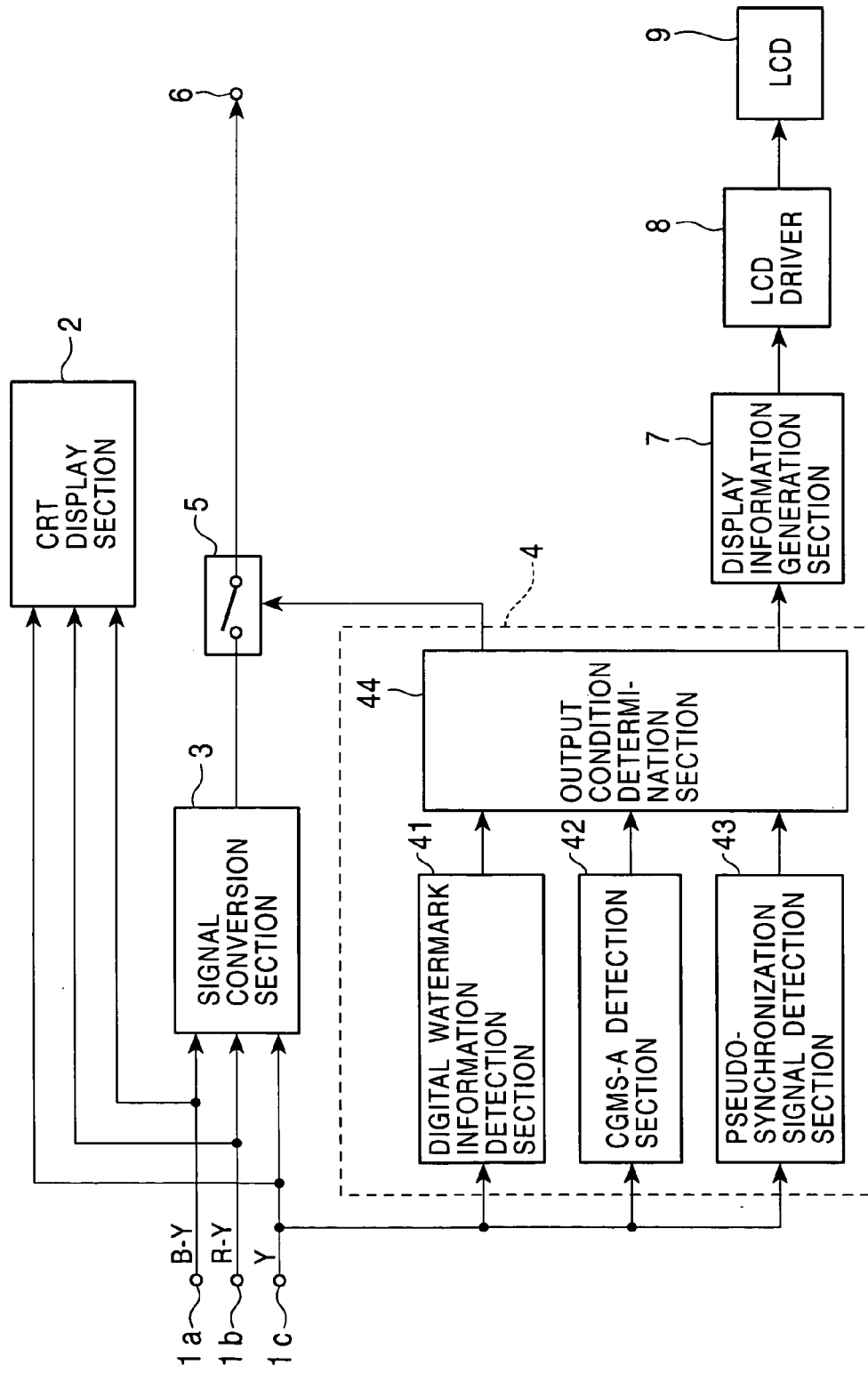
FIG. 1 is a block diagram illustrating a monitor receiver of an embodiment of a signal conversion apparatus of the present invention.

FIG. 1 is a block diagram illustrating the monitor receiver of this first embodiment. As shown in FIG. 1, the monitor receiver of this first embodiment comprises input terminals 1a, 1b, and 1c for the color-difference signal B-Y, the color-difference signal R-Y, and the luminance signal Y, respectively, a CRT display section 2; a signal conversion section 3; an additional information detection/determination section 4; a switching circuit 5; an output terminal 6; a display information generation section 7; an LCD (liquid-crystal display), driver 8; and an LCD 9.

As shown in FIG. 1, the color-difference signal B-Y, the color-difference signal R-Y, and the luminance signal Y, which are input through the input terminals 1a, 1b, and 1c, respectively, are supplied to the CRT display section 2 and the signal conversion section 3.

The CRT display section 2 forms a signal for the three primary colors from the supplied luminance signal Y, the color-difference signal B-Y, and the color-difference signal R-Y, and supplies this signal to the CRT, so that a video image is displayed on the display surface of the CRT. Also, as shown in FIG. 1, in this first embodiment, the signal conversion section 3 forms a video signal for an NTSC method from the luminance signal Y, the color-difference signal B-Y, and the color-difference signal R-Y, and outputs this signal to the outside through the switching circuit 5 and the output terminal 6.

Furthermore, in this first embodiment, digital watermark information is superposed on the luminance signal Y input through the input terminal 1c, and CGMS information and a pseudo-synchronization signal for copy prevention are added to the signal in a vertical blanking period. This luminance signal Y is also supplied to the additional information detection/determination section 4.

As shown in FIG. 1, the additional information detection/determination section 4 comprises a digital watermark information detection section 41, a CGMS-A detection section 42, a pseudo-synchronization signal detection section 43, and an output condition determination section 44. Furthermore, the additional information detection/determination section 4 detects each piece of additional information superposed on or added to the supplied luminance signal Y, and determines whether or not the video signal of the NTSC method, which is converted and formed in the signal conversion section 3, can be output in accordance with the detected additional information.

More specifically, the luminance signal Y input through the input terminal 1c is supplied to the digital watermark information detection section 41, the CGMS-A detection section 42, and the pseudo-synchronization signal detection section 43 of the additional information detection and determination section 4.

The digital watermark information detection section 41 detects digital watermark information superposed on the luminance signal Y. The digital watermark information superposed on the luminance signal Y is a spectrum diffusion signal which is spectrum-diffused by a PN code as described above. In this case, the spectrum diffusion signal is reset at a timing synchronized with a video synchronization signal, for example, as a 1-frame period or a 2-frame period, and is spectrum-diffused by a PN code sequence generated at a sufficiently early period synchronized with the video synchronization signal.

For this reason, in the digital watermark information detection section 41, a video synchronization signal is separated from the supplied luminance signal Y, and a timing signal is formed for generating a PN code sequence of the same sequence from the start thereof at the same timing as when a spectrum diffusion signal superposed on the luminance signal Y is spectrum-diffused and superposed onto the luminance signal Y.

Then, a PN code sequence is generated using this timing signal, and by performing inverse spectrum diffusion using this sequence, digital watermark information which is a spectrum diffusion signal superposed on the luminance signal Y is detected, and this signal is supplied to the output condition determination section 44.

The CGMS-A detection section 42 detects CGMS information added to the luminance signal Y from the luminance signal Y. Here, CGMS-A indicates a copy generation limitation method of the CGMS method for an analog video signal. The CGMS-A detection section 42 detects CGMS information for an analog video signal, superposed in a predetermined horizontal interval of the vertical blanking period of the supplied analog luminance signal Y, and supplies this information to the output condition determination section 44.

As was also described above, the pseudo-synchronization signal detection section 43 detects the presence or absence of a pseudo-synchronization signal for copy prevention, added to the luminance signal Y, in order to disable normal playback of a copied video signal, and supplies the detection result to the output condition determination section 44.

The output condition determination section 44 receives detection outputs from the digital watermark information detection section 41, the CGMS-A detection section 42, and the pseudo-synchronization signal detection section 43, and determines whether or not the video signal supplied to the monitor receiver of this embodiment is a signal which cannot be output since appropriate copying control cannot be performed because the signal is copy-prohibited and because when the relevant video signal is signal-converted and output, the additional information is lost. That is, the output condition determination section 44 determines whether or not the video signal of the NTSC method, which is signal-converted and formed in the signal conversion section 3, can be output in accordance with the detection outputs from the digital watermark information detection section 41, the CGMS-A detection section 42, and the pseudo-synchronization signal detection section 43.

In this first embodiment, when highly reliable digital watermark information, which is difficult to remove or counterfeit, has been superposed on the luminance signal Y, the output condition determination section 44 determines whether or not the video signal of the NTSC method from the signal conversion section 3 can be output in accordance with this digital watermark information.

Therefore, when the digital watermark information has been superposed on the luminance signal Y, and the digital watermark information indicates copy prohibition or prohibition of subsequent copying, the output condition determination section 44 forms a control signal for turning off the switching circuit 5 and supplies this signal to the switching circuit 5. Also, when the digital watermark information does not indicate copy prohibition, the output condition determination section 44 forms a control signal for turning on the switching circuit 5 and supplies this signal to the switching circuit 5.

As a result, when the digital watermark information indicates copy prohibition, since the switching circuit 5 is turned off, the video signal of the NTSC method from the switching circuit 5 is not output to the outside, and the use of the video signal after conversion from the signal conversion section 3 is limited. Also, when the digital watermark information does not indicate copy prohibition, since the switching circuit 5 is turned on, the video signal of the NTSC method from the signal conversion section 3 is output to the outside. As described above, the switching circuit 5 has a function as a use-limitation unit for a signal after conversion in this first embodiment.

Also, when the digital watermark information has not been superposed on the luminance signal Y, the output condition determination section 44 determines whether or not the video signal of the NTSC method from the signal conversion section 3 can be output on the basis of the CGMS information. In this case, when the CGMS information indicates copy prohibition, the output condition determination section 44 forms a control signal for turning off the switching circuit 5, and when the CGMS information does not indicate copy prohibition, the output condition determination section 44 forms a control signal for turning on the switching circuit 5.

Also, when the output condition determination section 44 determines that neither the digital watermark information nor the CGMS information is present in the luminance signal Y, the output condition determination section 44 forms a control signal to be supplied to the switching circuit 5 according to the presence or absence of the pseudo-synchronization signal for copy prevention. That is, in this case, the output condition determination section 44 forms a signal for turning off the switching circuit 5 when the detection output from the pseudo-synchronization signal detection section 43 is a signal indicating that the pseudo-synchronization signal for copy prevention has been detected, and when the detection output from the pseudo-synchronization signal detection section 43 is a signal indicating that the pseudo-synchronization signal for copy prevention has not been detected, the output condition determination section 44 forms a signal for turning on the switching circuit 5.

In this way, the control signal for switching, formed in the output condition determination section 44, is supplied to the switching circuit 5, so that switching control of a switch is performed by this control signal in a manner as described above, thereby limiting the output of the video signal of the NTSC method from the signal conversion section 3.

Also, in this first embodiment, as described above, the output condition determination section 44 forms a control signal for notifying whether the video signal of the NTSC method, which is signal-converted and formed by the signal conversion section 3, can be output or cannot be output on the basis of the detection outputs from the digital watermark information detection section 41, the CGMS-A detection section 42, and the pseudo-synchronization signal detection section 43, and supplies this signal to the display information generation section 7.

The display information generation section 7 forms a display message for notifying that the control signal from the output condition determination section 44 indicates whether the video signal of the NTSC method from the signal conversion section 3 cannot be output or can be output, and supplies this message to the LCD 9 through the LCD driver 8. As a result, it is possible to quickly and accurately notify a user, in this embodiment, of whether or not the video signal of the NTSC method after signal conversion can be output to the LCD 9.

Therefore, even when the switching circuit 5 is turned off in accordance with a control signal from the output condition determination section 44 and the video signal of the NTSC method which is signal-converted and formed in the signal conversion section 3 is not output, the fact that since copying of the input video signal is prohibited, the signal after conversion is not output can be informed to the user of this monitor receiver through the LCD 9. As a result, when the signal after conversion is not output from the monitor receiver of this first embodiment, this is not misunderstood as a failure of the monitor receiver.

Figure 2:
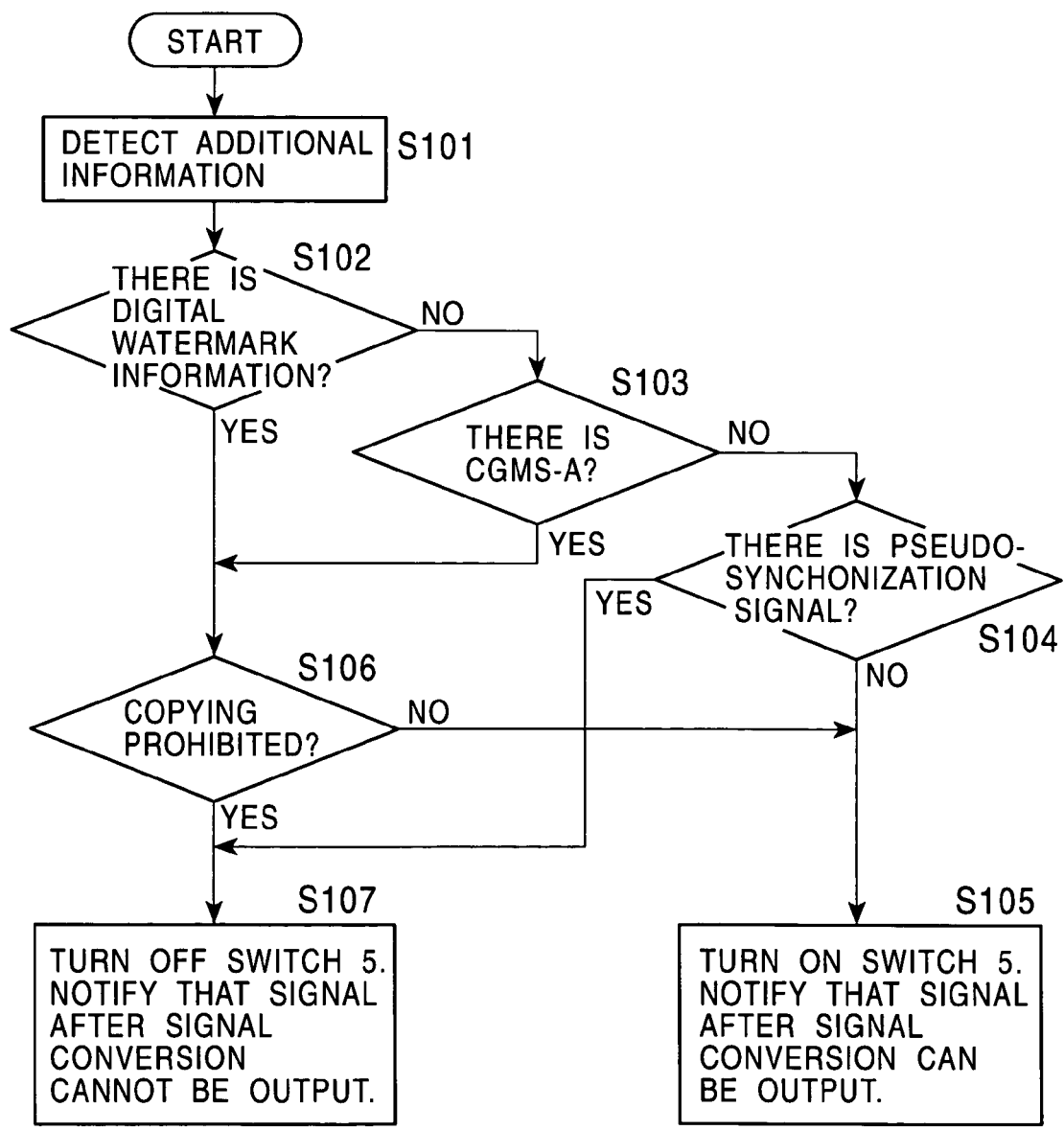
FIG. 2 is a flowchart illustrating an output control process for a signal after signal conversion, which is performed by an additional information detection/determination section of the monitor receiver shown in FIG. 1.

Next, referring to the flowchart of FIG. 2, a description is given of the output control of a video signal of the NTSC method, which is signal-converted and formed, performed in the monitor receiver of this first embodiment, with emphasis on the operation of the additional information detection/determination section 4.

As described above, in the monitor receiver of this embodiment, the luminance signal Y and the color-difference signals B-Y and R-Y, which are supplied through the input terminals 1a, 1b, and 1c, respectively, are supplied to the CRT display section 2 and the signal conversion section 3. When the power of the monitor receiver of this embodiment is switched on, in the CRT display section 2, a process for displaying a video image formed by the luminance signal Y and the color-difference signals B-Y and R-Y is performed, and in the signal conversion section 3, a process for forming a video signal of the NTSC method by performing signal conversion is performed.

At the same time, the luminance signal Y is supplied to the additional information detection/determination section 4 whereby a process shown in FIG. 2 is performed to perform output control of the video signal of the NTSC method which is signal-converted and formed. In this case, the luminance signal Y supplied through the input terminal 1c is supplied to each of the digital watermark information detection section 41, the CGMS-A detection section 42, and the pseudo-synchronization signal detection section 43 of the additional information detection/determination section 4, whereby a process for detecting the digital watermark information superposed on or added to the luminance signal Y, a process for detecting the CGMS information, and a process for detecting the pseudo-synchronization signal for copy prevention are performed, and the detection results are supplied to the output condition determination section 44 (step S101).

Then, the output condition determination section 44 determines whether or not the digital watermark information has been superposed on the luminance signal Y on the basis of the detection output from the digital watermark information detection section 41 (step S102). When it is determined in the determination process of step S102 that the digital watermark information has not been superposed, the output condition determination section 44 determines whether or not the CGMS information has been added to the luminance signal Y on the basis of the detection output from the CGMS-A detection section 42 (step S103).

When it is determined in the determination process of step S103 that the CGMS information has not been added, the output condition determination section 44 determines whether or not the pseudo-synchronization signal for copy prevention has been added to the luminance signal Y on the basis of the detection output from the pseudo-synchronization signal detection section 43 (step S104).

When it is determined in the determination process of step S104 that the pseudo-synchronization signal for copy prevention has not been added, since no additional information has been superposed on or added to the luminance signal Y, the output condition determination section 44 performs control so as to turn on the switch 5 so that the video signal of the NTSC method which is signal-converted and formed is output through the output terminal 6 and a message is displayed on the LCD 9, thus notifying that copying of the video signal of the NTSC method which is signal-converted and formed has not been prohibited and that the video signal is a signal which can be output (step S105).

Also, when it is determined in the determination process of step S102 that the digital watermark information has been superposed on the luminance signal Y, or when it is determined in the determination process of step S103 that the CGMS information has been added to the luminance signal Y, the output condition determination section 44 determines whether or not the superposed digital watermark information or the added CGMS information indicates copy prohibition of the video signal which is input to the monitor receiver of this embodiment (step S106).

When it is determined in the determination process of step S106 that the superposed digital watermark information or the added CGMS information is information which indicates copy prohibition, the output condition determination section 44 performs control so as to turn off the switch 5 so that the video signal of the NTSC method, which is signal-converted and formed, is not output to the outside and so that a message is displayed on the LCD 9, thus notifying that copying of the video signal of the NTSC method, which is signal-converted and formed, is prohibited and the signal cannot be output (step S107).

Also, when it is determined in the determination process of step S106 that the superposed digital watermark information or the added CGMS information is information which does not indicate copy prohibition, the process proceeds to step S105 where, as described above, the video signal of the NTSC method, which is signal-converted and formed, is output, and the fact that the video signal of the NTSC method, which is signal-converted and formed, can be output is notified through the LCD 9.

Also, when it is determined in the determination process of step S104 that there is a pseudo-synchronization signal for copy prevention, the video signal supplied to the monitor receiver of this embodiment is determined to be such that copying is prohibited, and the process proceeds to step S107 where, as described above, the video signal of the NTSC method, which is signal-converted and formed, is not output to the outside, and the fact that the video signal of the NTSC method, which is signal-converted and formed, cannot be output is notified through the LCD 9.

As described above, the monitor receiver of this embodiment comprises the signal conversion section 3, and has the functions for converting the luminance signal Y and the color-difference signals B-Y and R-Y in order to form a video signal of the NTSC method and for outputting this signal. As was also described above, usually, when signal conversion is performed, additional information superposed on or added to the video signal before signal conversion is lost or is deteriorated. As a result, for example, in the recording apparatus for receiving the video signal after signal conversion, there is a case in which the additional information cannot be detected, and copying control in accordance with the additional information cannot be performed.

However, in the case of the monitor receiver of this first embodiment, since the output from the monitor receiver, of the video signal after signal conversion is controlled in accordance with the additional information superposed on or added to the video signal before signal conversion, it is possible to reliably protect the copyright of the video signal which is input to the monitor receiver of this first embodiment and which is signal-converted.

Therefore, for example, in a recording apparatus for receiving a video signal of the NTSC method, which is signal-converted and formed in the monitor receiver of this embodiment, even if additional information, such as digital watermark information, CGMS information, and a pseudo-synchronization signal for copy prevention, which can be detected, is not output by re-superposing or re-adding it in the monitor receiver of this embodiment, it is possible to reliably protect the copyright of the video signal which is signal-converted in this monitor receiver. Furthermore, since additional information need not to be re-superposed on or re-added to the video signal to be output, the cost of the monitor receiver is not increased.

As described above, the monitor receiver of this first embodiment has mounted therein a signal conversion apparatus comprising the signal conversion section 3; the additional information detection/determination section 4; the switching circuit 5; the display information generation section 7; the LCD driver 8; and the LCD 9, and has a function for outputting a video signal after conversion, which is formed by signal-converting an input video signal. However, as described above, since the output of the video signal after conversion is controlled in accordance with the additional information added to the input video signal, the monitor receiver of this embodiment will not become a bypass apparatus for illegally copying a video signal, the copying of which is prohibited.

Also, in this first embodiment, if the detection results of the three additional pieces of information match each other, output determination is possible without any problem. However, if one of the detection results of the three additional pieces of information differs, the determination result of the digital watermark information takes priority in terms of the level of security, and next, the determination result of the CGMS information in which generation control is possible takes priority. Also, of the three additional pieces of information, the additional information of a condition closest to the copy prohibition may take priority.

In this embodiment, a pseudo-synchronization signal for copy prevention is detected. However, when the partial inversion of the phase of a color burst signal for causing a video signal which is copy-recorded not to be used normally is detected by using the difference in the characteristics of the APC, the input video signal may be determined to be such that copy recording is limited. It is of course possible to detect both the pseudo-synchronization signal and the partial phase inversion of a color burst signal and, when one of them is detected, to determine that copy recording of the input video signal is limited.

Second Embodiment

For the signal conversion process, not only is a process performed for converting component signals formed of the above-mentioned luminance and color-difference signals into a video signal of the NTSC method, but also various signal conversions are performed. For example, when the input signal is a video signal, various signal conversions, such as conversion of the number of scanning lines, conversion of a scanning method, and conversion of the format of the video signal, are performed.

Accordingly, in the following, by using specific examples of signal conversion, a signal conversion apparatus according to the present invention is described. The signal conversion apparatus described below is mounted in, for example, a monitor receiver or a playback apparatus for a video signal and is used, or it is used as a signal conversion apparatus for converting a video signal which cannot be used because, for example, the signal format is different, into a video signal which can be used.

[Signal Conversion Apparatus for Converting the Number of Scanning Lines]

Figure 3:
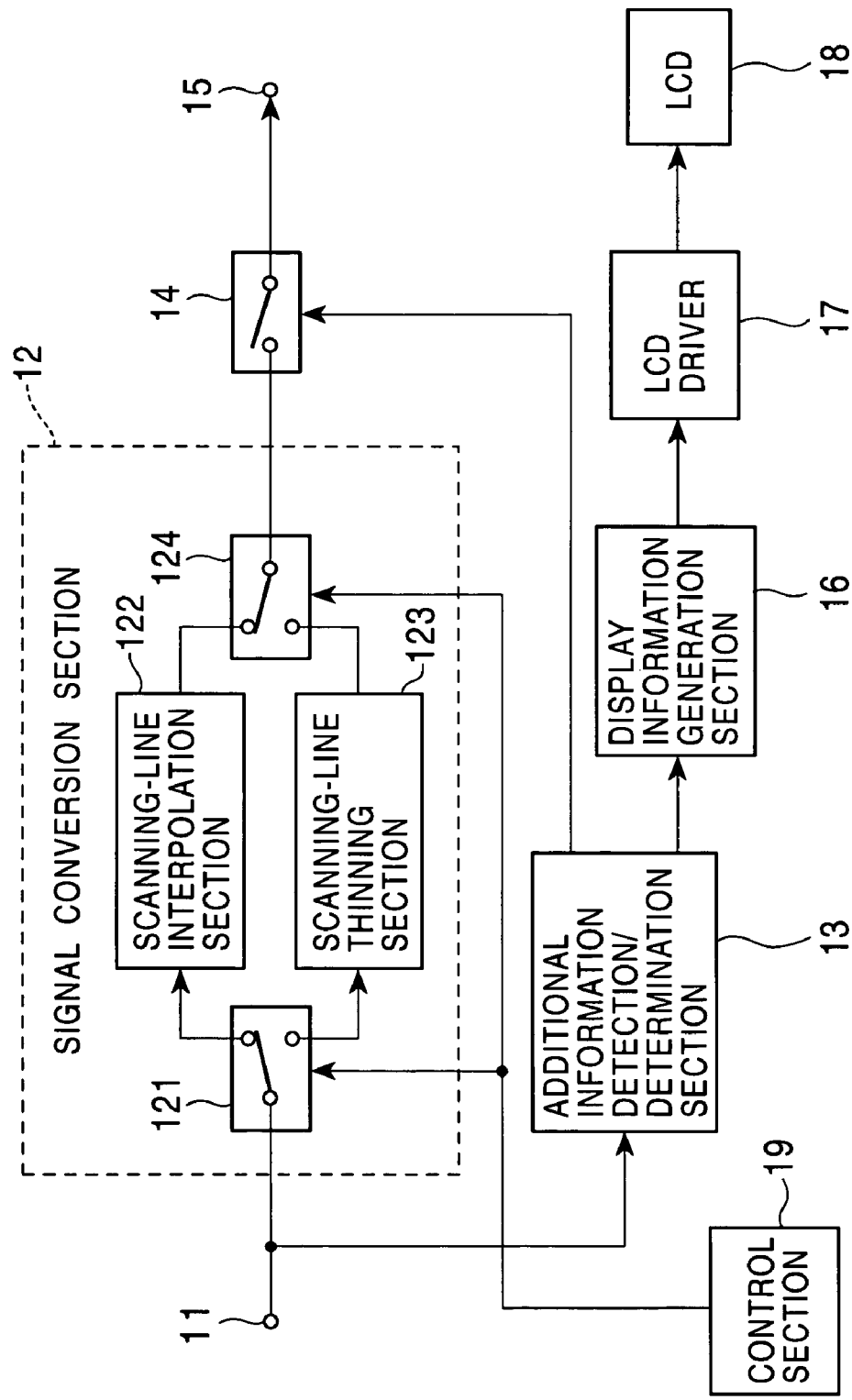
FIG. 3 is a block diagram illustrating another example of a signal conversion apparatus of the present invention.

FIG. 3 is a block diagram illustrating a signal conversion apparatus for converting the number of scanning lines of a supplied video signal. As shown in FIG. 3, the signal conversion apparatus of this example comprises an input terminal 11 for a video signal; a signal conversion section 12; an additional information detection/determination section 13; a switching circuit 14; an output terminal 15; a display information generation section 16; an LCD driver 17; an LCD 18; and a control section 19.

The control section 19 is a microcomputer comprising a CPU, a ROM, and a RAM. The control section 19 forms a control signal for controlling each section in response to an operation input from a user, which is input, for example, through a key operation section (not shown), and supplies this signal to each section, so that the signal conversion apparatus of this example is controlled.

Then, the video signal supplied through the input terminal 11 is supplied to the signal conversion section 12 and the additional information detection/determination section 13. The signal conversion section 12 of this example comprises switching circuits 121 and 124, a scanning-line interpolation section 122, and a scanning-line thinning section 123.

When, for example, a video signal having 525 scanning lines per frame is converted into a video signal having 1080 scanning lines per frame, the scanning-line interpolation section 122 performs a process for interpolating scanning lines for an amount of shortage on the input video signal. Also, the scanning-line thinning section 123 performs a process for thinning scanning lines from the input video signal when, for example, a video signal having 1080 scanning lines per frame is converted into a video signal having 525 scanning lines per frame.

In this manner, the signal conversion section 12 of this example is capable of interpolating and thinning the scanning lines of the input video signal. Furthermore, the switching circuits 121 and 124 of the signal conversion section 12 are switched in linkage with each other in accordance with a control signal from the control section 19 in response to the selection input of the user.

Then, receiving a video signal having 525 scanning lines per frame, when this signal is converted into a video signal having 1080 scanning lines per frame, both the switching circuits 121 and 124 are switched to the scanning-line interpolation section 122 side in accordance with a control signal from the control section 19.

As a result, the video signal having 525 scanning lines per frame is supplied to the scanning-line interpolation section 122 through the input terminal 11 and the switching circuit 121, and the scanning lines are interpolated in the scanning-line interpolation section 122, thereby the signal is converted into a video signal having 1080 scanning lines per frame. This video signal after conversion is supplied to the switching circuit 14 through the switching circuit 124.

Also, receiving a video signal having 1080 scanning lines per frame, when this signal is converted into a video signal having 525 scanning lines per frame, both the switching circuits 121 and 124 are switched to the scanning-line thinning section 123 side in accordance with a control signal from the control section 19.

As a result, the video signal having 1080 scanning lines per frame is supplied to the scanning-line thinning section 123 through the input terminal 11 and the switching circuit 121, and the scanning lines are thinned in the scanning-line thinning section 123, thereby the signal is converted into a video signal having 525 scanning lines per frame. This video signal after conversion is supplied to the switching circuit 14 through the switching circuit 124.

On the other hand, the additional information detection/determination section 13 is constructed similarly to the additional information detection/determination section 4 of the monitor receiver of the above-described first embodiment, and comprises a digital watermark information detection section, a CGMS-A detection section, a pseudo-synchronization signal detection section, and an output condition determination section. The additional information detection/determination section 13 detects a plurality of additional pieces of information added to the supplied video signal, and determines whether or not the video signal after signal conversion can be output on the basis of the detected additional information.

Then, when the additional information detection/determination section 13 determines that the video signal after signal conversion cannot be output similarly to the additional information detection/determination section 4 of the above-described first embodiment, the additional information detection/determination section 13 forms a control signal for turning off the switching circuit 14 and supplies the signal to the switching circuit 14. Also, at this time, the additional information detection/determination section 13 controls the display information generation section 16 so that a message is generated for notifying that the video signal after signal conversion cannot be output, and this message is supplied to the LCD 18 through the LCD driver 17 and is displayed on the display surface of the LCD 18.

When the additional information detection/determination section 13 determines that the video signal after signal conversion can be output, the additional information detection/determination section 13 forms a control signal for turning on the switching circuit 14 and supplies the signal to the switching circuit 14. Also, the additional information detection/determination section 13 controls the display information generation section 16 so that a message is generated for notifying that the video signal after signal conversion can be output and this message is supplied to the LCD 18 through the LCD driver 17 and is displayed on the display surface of the LCD 18.

In the case of this example, the signal conversion section 12 changes the number of scanning lines of a video signal. When the number of scanning lines is increased, and also when the number of scanning lines is decreased, the digital watermark information superposed on the input video signal is deteriorated, and when the video synchronization signal is renewed, the CGMS information and the pseudo-synchronization signal for copy prevention are lost. For this reason, even if additional information indicating that copying is prohibited is superposed on or added to the input video signal, there are times when it is not possible to detect this additional information from the video signal after signal conversion in order to appropriately perform copying control.

However, in the signal conversion apparatus of this example, similarly to the monitor receiver of the above-described first embodiment, the output of the video signal after signal conversion can be controlled on the basis of the additional information superposed on or added to the input video signal, making it possible to reliably protect the copyright of the input video signal.

In this example, a description is given by using cases, as examples, in which a video signal having 525 scanning lines per frame is converted into a video signal having 1080 scanning lines per frame, and in contrast, a video signal having 1080 scanning lines per frame is converted into a video signal having 525 scanning lines per frame. However, this is not so limited.

For example, it is also possible to perform mutual conversion between a video signal having 525 scanning lines per frame and a video signal having 720 scanning lines per frame, and to perform mutual conversion between a video signal having 1080 scanning lines per frame and a video signal having 720 scanning lines per frame.

For example, by inputting the number of scanning lines per frame of the input video signal and the number of scanning lines per frame of the video signal after conversion to the signal conversion apparatus of this example, a video signal having a desired number of scanning lines can also be formed.

[Signal Conversion Apparatus for Converting Scanning Method]

Figure 4:
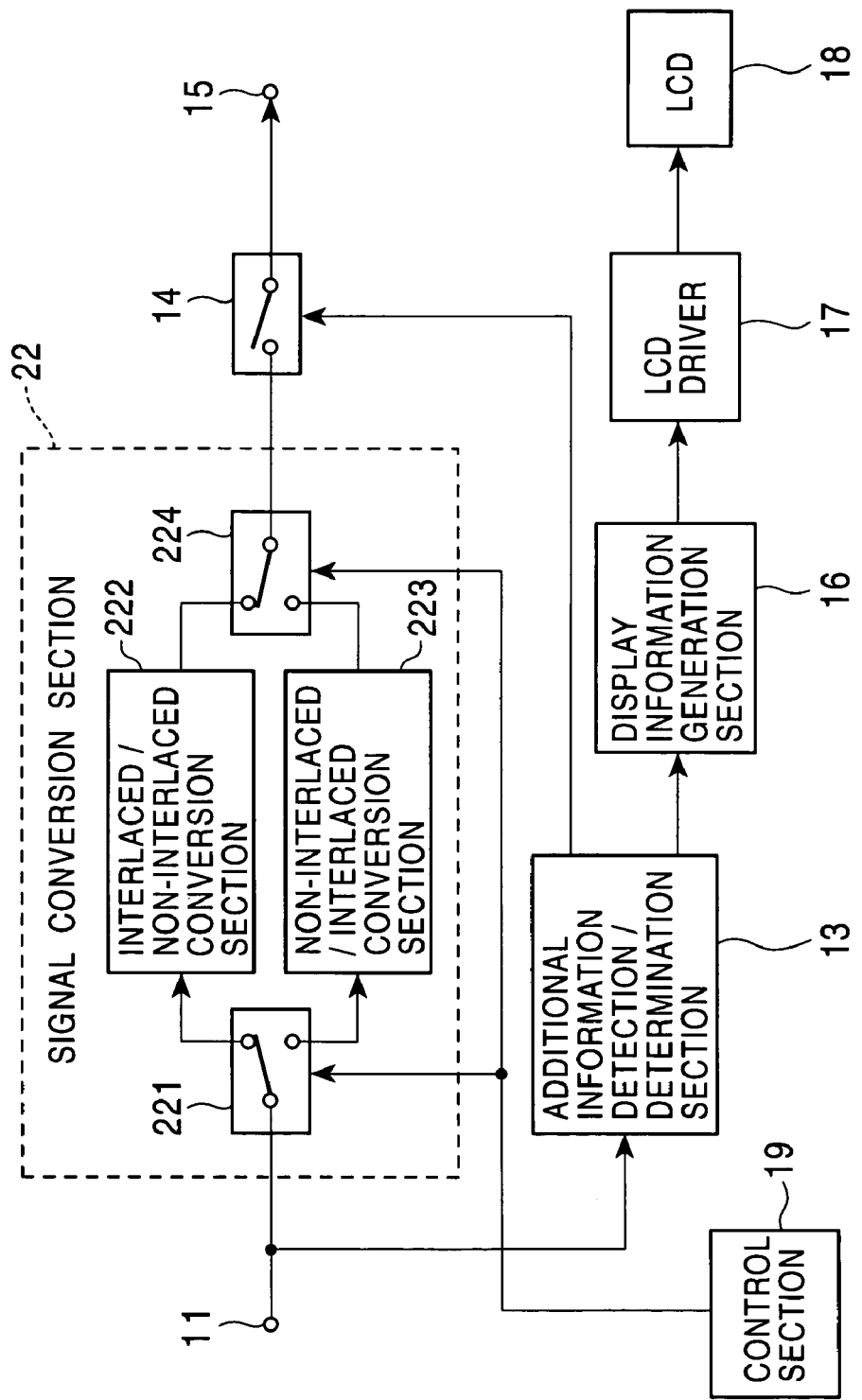
FIG. 4 is a block diagram illustrating another example of a signal conversion apparatus of the present invention.

FIG. 4 is a block diagram illustrating a signal conversion apparatus for performing a conversion of the scanning method of a supplied video signal. In the signal conversion apparatus shown in FIG. 4, components which are constructed similarly to those of the signal conversion apparatus described with reference to FIG. 3 are given the same reference numerals, and accordingly, descriptions thereof have been omitted.

As shown in FIG. 4, the signal conversion apparatus of this example comprises an input terminal 11 for a video signal; a signal conversion section 22; an additional information detection/determination section 13; a switching circuit 14; an output terminal 15; a display information generation section 16; an LCD driver 17; an LCD 18; and a control section 19.

The signal conversion section 22 of the signal conversion apparatus of this example comprises switching circuits 221 and 224; an interlaced/non-interlaced (progressive scanning) conversion section 222; and a non-interlaced (progressive scanning)/interlaced conversion section 223. The switching circuits 221 and 224 are switched in accordance with a control signal from the control section 19 in response to the selection input from a user in a manner similar to that for the switching circuits 121 and 124 of the signal conversion section 12 described with reference to FIG. 3.

When the video signal input through an input terminal 11 is a video signal of an interlaced method, and when the switching circuits 221 and 224 are switched to the interlaced/non-interlaced conversion section 222 side, the video signal input through the input terminal 11 is supplied to the interlaced/non-interlaced conversion section 222 through the switching circuit 221.

The interlaced/non-interlaced conversion section 222 converts a video signal of an interlaced method into a video signal of a non-interlaced method by synthesizing video signals for two fields which form a video image of the same frame, and supplies this signal to the switching circuit 14 through the switching circuit 224.

Also, when the video signal input through the input terminal 11 is a video signal of a non-interlaced method and when the switching circuits 221 and 224 are switched to the non-interlaced/interlaced conversion section 223 side, the video signal input through the input terminal 11 is supplied to the non-interlaced/interlaced conversion section 223 through the switching circuit 221.

The non-interlaced/interlaced conversion section 223 converts a video signal of a non-interlaced method into a video signal of an interlaced method by separating it into video signals for two fields of the same frame, and supplies these signals to the switching circuit 14 through the switching circuit 224.

The switching circuit 14 is switched in accordance with a control signal from the additional information detection/determination section 13 in a manner as described above. That is, also in this signal conversion apparatus shown in FIG. 4, it is determined whether or not the video signal after signal conversion can be output on the basis of the additional information superposed on or added to the video signal before signal conversion, and the switching circuit 14 is switched on the basis of this determination result, making it possible to reliably protect the copyright of the input video signal which is to be signal-converted.

More specifically, even if the scanning method is converted and the additional information superposed on or added to the input video signal is lost or deteriorated, it is possible to reliably and appropriately perform the output control of the video signal after signal conversion in order to reliably protect the copyright of the video signal which is to be signal-converted.

[Signal Conversion Apparatus for Performing Signal Format Conversion]

[① Signal Conversion Apparatus for Performing Mutual Signal Conversion Between HDTV and SDTV]

Figure 5:
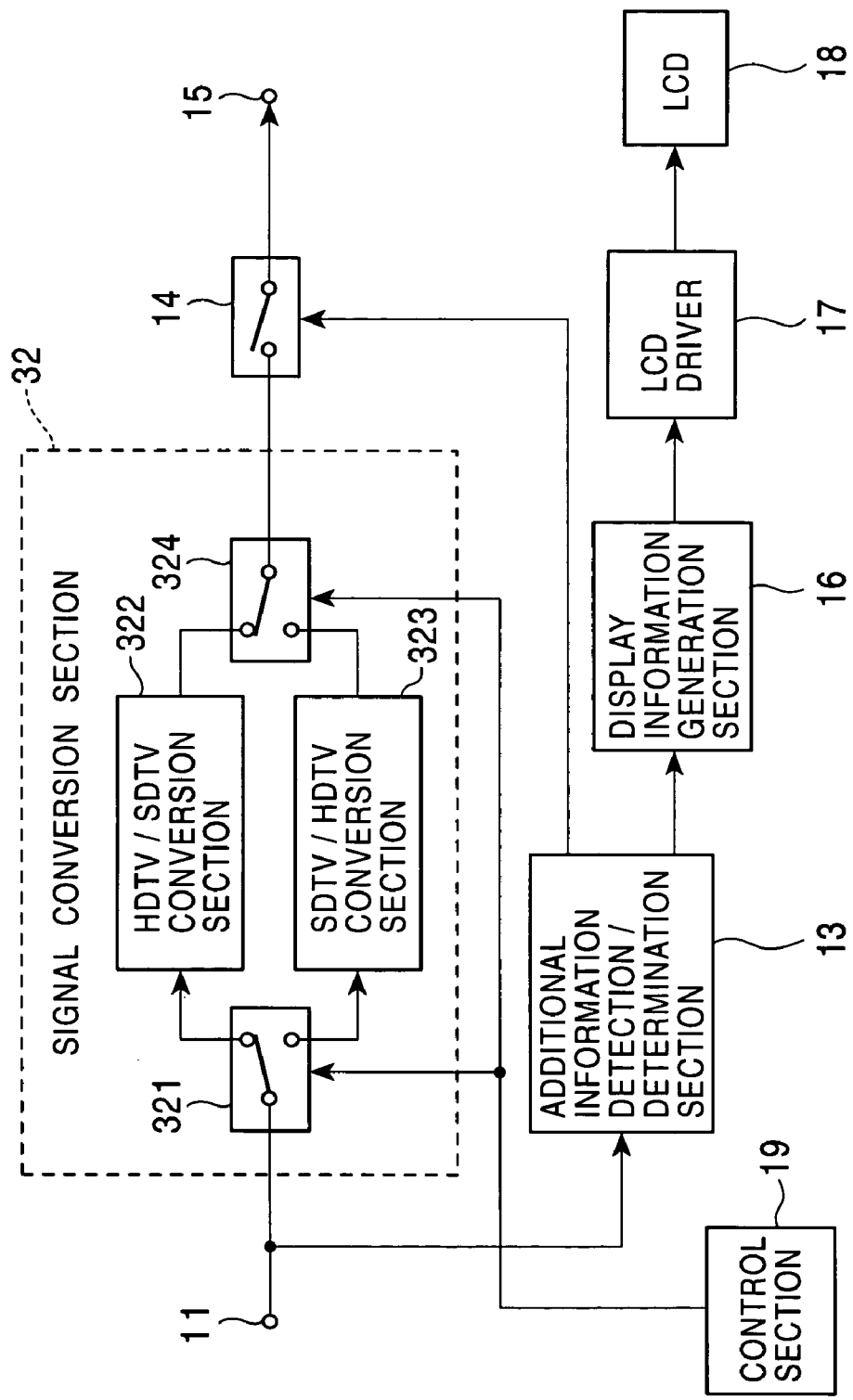
FIG. 5 is a block diagram illustrating another example of a signal conversion apparatus of the present invention.

FIG. 5 is a block diagram illustrating a signal conversion apparatus which is capable of performing mutual signal conversion between a video signal of an HDTV (high-definition television) method and a video signal of an SDTV (standard television) method. Also in this signal conversion apparatus shown in FIG. 5, components which are constructed similarly to those of the signal conversion apparatus described with reference to FIG. 3 are given the same reference numerals, and accordingly, descriptions thereof have been omitted.

As shown in FIG. 5, the signal conversion apparatus of this example comprises an input terminal 11 for a video signal; a signal conversion section 32; an additional information detection/determination section 13; a switching circuit 14; an output terminal 15; a display information generation section 16; an LCD driver 17; an LCD 18; and a control section 19.

The signal conversion section 32 of the signal conversion apparatus of this example comprises switching circuits 321 and 324, an HDTV/SDTV conversion section 322, and an SDTV/HDTV conversion section 323. The switching circuits 321 and 324 are switched in accordance with a control signal from the control section 19 in response to the selection input from a user in a manner similar to the switching circuits 121 and 122 of the signal conversion section 12 described with reference to FIG. 3.

When the video signal input through the input terminal 1 is a video signal of an HDTV method and when the switching circuits 321 and 324 are switched to the HDTV/SDTV conversion section 322 side, the video signal input through the input terminal 1 is supplied to the HDTV/SDTV conversion section 322 through the switching circuit 221.

The HDTV/SDTV conversion section 322 converts a video signal of an HDTV method into a video signal of an SDTV method by thinning the number of scanning lines and by decreasing the clock frequency in the horizontal direction, and supplies this signal to the switching circuit 14 through the switching circuit 224.

Furthermore, when the video signal input through the input terminal 11 is a video signal of an SDTV method and when the switching circuits 321 and 324 are switched to the SDTV/HDTV conversion section 323 side, the video signal input through the input terminal 11 is supplied to the SDTV/HDTV conversion section 323 through the switching circuit 321.

The SDTV/HDTV conversion section 323 converts a video signal of an SDTV method into a video signal of an HDTV method by interpolating scanning lines or by increasing the clock frequency in the horizontal direction, and supplies this signal to the switching circuit 14 through the switching circuit 324.

The switching circuit 14 is switched in accordance with a control signal from the additional information detection/determination section 13 in a manner as described above. That is, also in this signal conversion apparatus shown in FIG. 5, it is determined whether or not the video signal after signal conversion can be output on the basis of the additional information superposed on or added to the video signal before signal conversion, and the switching circuit 14 is switched on the basis of this determination result.

Therefore, when a video signal of an HDTV method is converted into a video signal of an SDTV method or when, in contrast, a video signal of an SDTV method is converted into a video signal of an HDTV method, the additional information superposed on or added to the video signal before signal conversion may be lost or deteriorated.

However, in this case, since the output of the video signal after signal conversion is controlled in accordance with the additional information added to the video signal before signal conversion, it is possible to reliably protect the copyright of the video signal which is supplied to this signal conversion apparatus and which is converted thereby.

The HDTV/SDTV conversion section 322 is capable of converting a video signal of 1080i, 720p, or 525p into a video signal of 525i, and the SDTV/HDTV conversion section 323 is capable of converting a video signal of 525i into a video signal of 1080i, 720p, or 525p. Here, 525, 720, and 1080 indicate the number of scanning lines, "i" indicates that the scanning method is an interlaced method, and "p" indicates that the scanning method is a non-interlaced method (progressive).

It is possible for the user to select which type of video signal the video signal of the HDTV method is through, for example, a key operation section connected to the control section 19.

[②] Signal Conversion Apparatus for Performing Mutual Signal Conversion Between VGA and TV]

Figure 6:
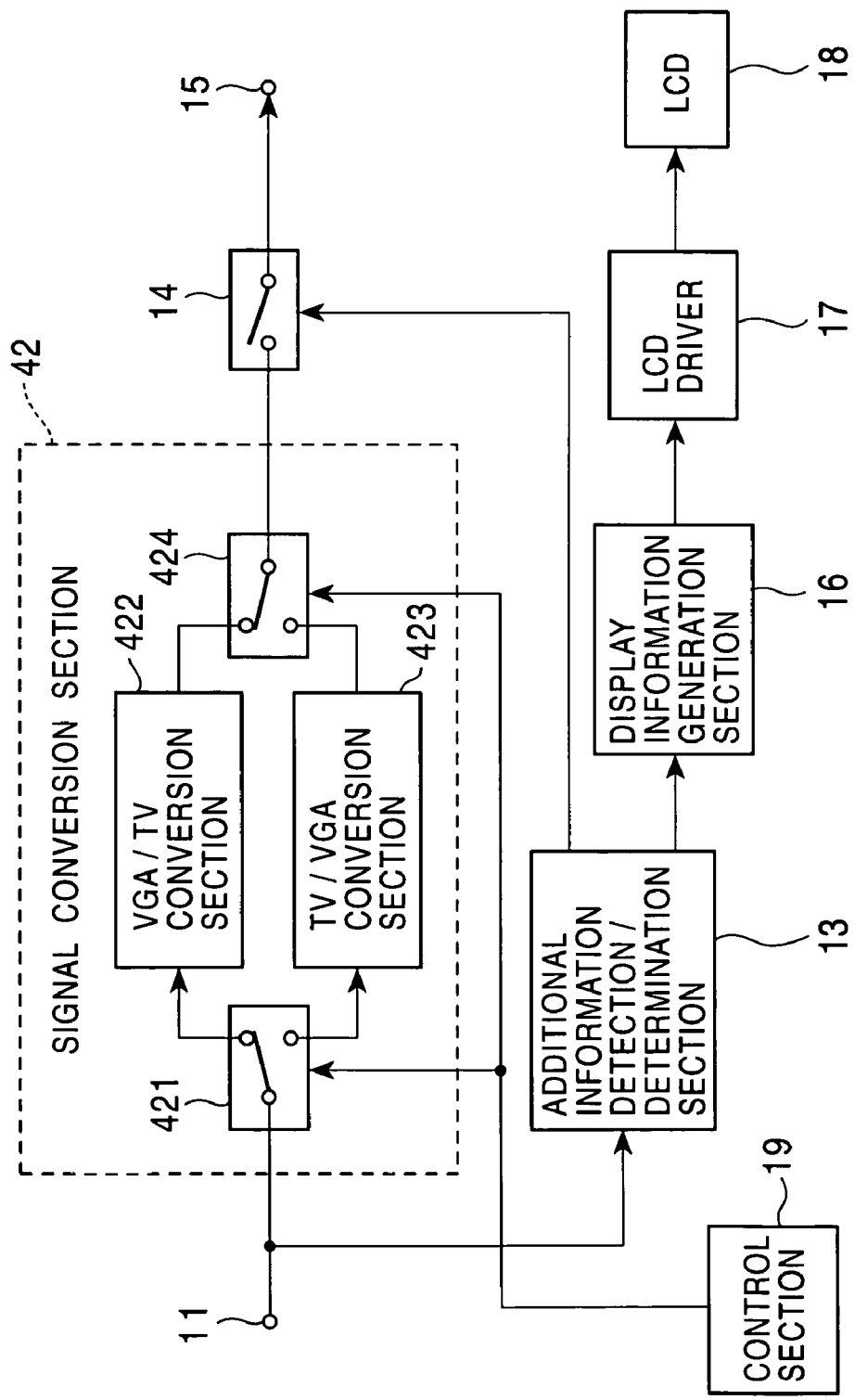
FIG. 6 is a block diagram illustrating another example of a signal conversion apparatus of the present invention.

FIG. 6 is a block diagram illustrating a signal conversion apparatus which is capable of performing mutual signal conversion between a video signal of an image data format for a computer, and a video signal of an HDTV (high-definition television) method or a video signal of an SDTV (standard television) method. Also in this signal conversion apparatus shown in FIG. 6, components which are constructed similarly to those of the signal conversion apparatus described with reference to FIG. 3 are given the same reference numerals, and accordingly, descriptions thereof have been omitted.

As shown in FIG. 6, the signal conversion apparatus of this example comprises an input terminal 11 for a video signal; a signal conversion section 42; an additional information detection/determination section 13; a switching circuit 14; an output terminal 15; a display information generation section 16; an LCD driver 17; an LCD 18; and a control section 19.

The signal conversion section 42 of this example comprises switching circuits 421 and 424; a VGA/TV conversion section 422 for converting a video signal of an image data format for a computer, i.e., a VGA (Video Graphics Array) standard in this example, into a video signal of an HDTV method; and a TV/VGA conversion section 423 for performing a process which is the reverse of that of this VGA/TV conversion section 422, that is, converting a video signal of an HDTV method into a video signal of a VGA standard. The switching circuits 421 and 424 are switched in accordance with a control signal from the control section 19 in response to the selection input from a user in a manner similar to that for the switching circuits 121 and 122 of the signal conversion section 12 described with reference to FIG. 3.

Then, when the video signal input through the input terminal 11 is a video signal of a VGA standard and when the switching circuits 421 and 424 are switched to the VGA/TV conversion section 422 side, the video signal input through the input terminal 11 is supplied to the VGA/TV conversion section 422 through the switching circuit 421.

The VGA/TV conversion section 422 converts a video signal of a VGA standard for computer processing into a video signal of an HDTV method and, for example, supplies a video signal generated by using a computer to the monitor receiver whereby the signal is converted into a signal in a form in which the video signal can be displayed and is output. This video signal after signal conversion is supplied to the switching circuit 14 through the switching circuit 424.

Also, when the video signal input through the input terminal 11 is a video signal of an HDTV method and when the switching circuits 421 and 424 are switched to the TV/VGA conversion section 423 side, the video signal input through the input terminal 1 is supplied to the TV/VGA conversion section 423 through the switching circuit 421.

The TV/VGA conversion section 423 converts a video signal of an HDTV method into a video signal of a VGA standard. As a result, for example, a video signal photographed using a video camera can be converted into a signal in a form which can be processed by using a computer and which can be output. This video signal converted into a video signal of an HDTV method is supplied to the switching circuit 14 through the switching circuit 424.

Also in this case, the switching circuit 14 is switched in accordance with a switching control signal from the additional information detection/determination section 13 in a manner as described above. That is, also in this signal conversion apparatus shown in FIG. 6, it is determined whether or not the video signal after signal conversion can be output on the basis of the additional information superposed on or added to the video signal before signal conversion, and the switching circuit 14 is switched according to this determination result.

Therefore, when a video signal of a VGA standard is converted into a video signal of an HDTV method or when, in contrast, a video signal of an HDTV method is converted into a video signal of a VGA method, the additional information superposed on or added to the video signal before signal conversion may be lost or deteriorated.

However, also in this example, since the output of the video signal after signal conversion is controlled in accordance with the additional information added to the video signal before signal conversion, it is possible to reliably protect the copyright of the video signal supplied to this signal conversion apparatus.

The additional information detection/determination section 13 of the signal conversion apparatus described with reference to FIGS. 3 to 6 detects a plurality of additional pieces of information added to the signal before signal conversion and performs control of the output of the signal after signal conversion on the basis of the detected additional information in a manner similar to the additional information detection/determination section 4 of the first embodiment described with reference to the flowchart of FIG. 2.

A description has been given assuming that the signal conversion apparatus of this example performs mutual signal conversion between a video signal of a VGA method and a video signal of an HDTV method. In addition, it is of course possible to perform mutual signal conversion between a video signal of a VGA method and a video signal of an SDTV method. [③ Signal Conversion Apparatus for Performing Signal Conversion of NTSC→PAL, etc.]

Figure 7:
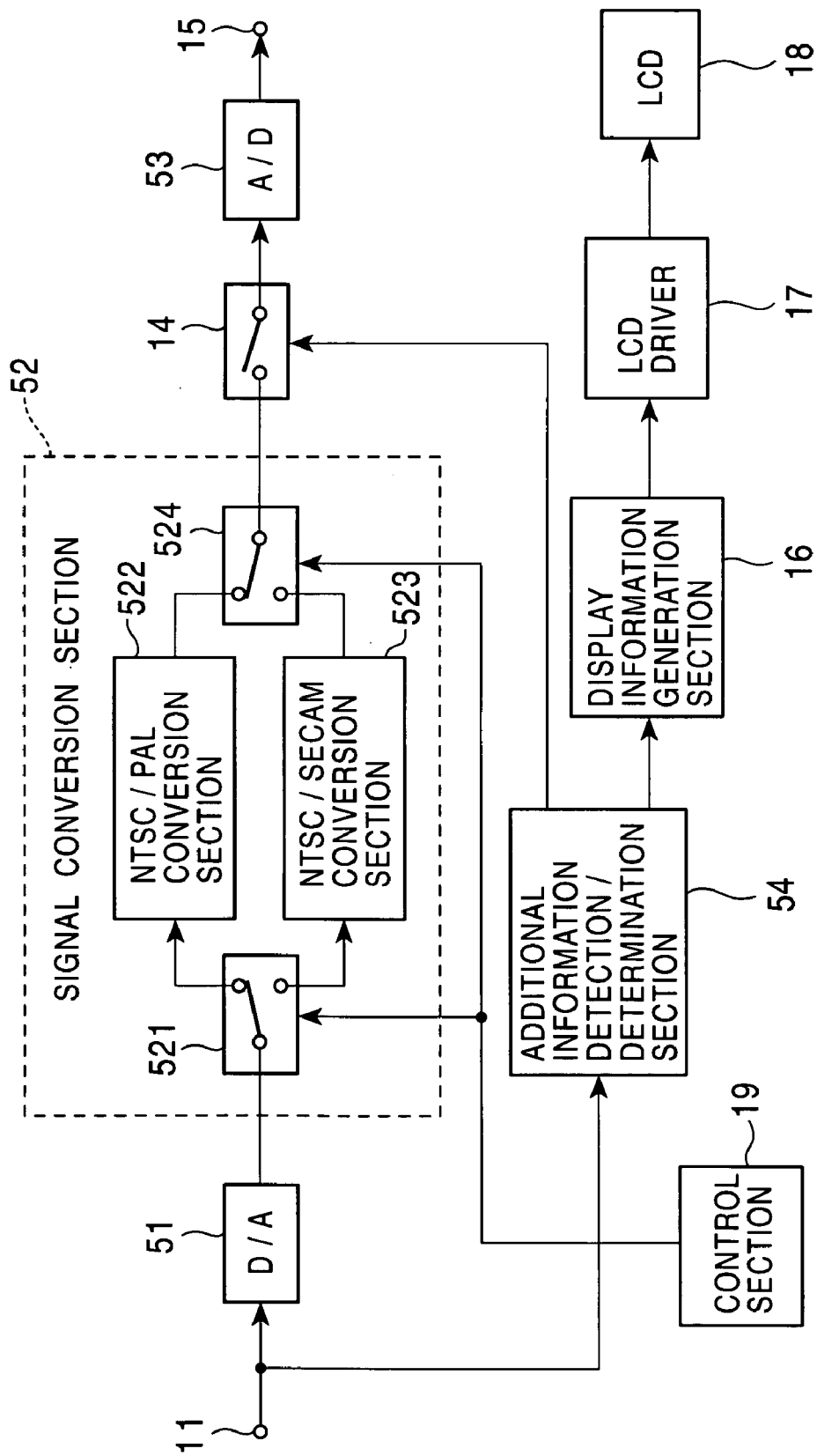
FIG. 7 is a block diagram illustrating another example of a signal conversion apparatus of the present invention.

FIG. 7 is a block diagram illustrating a signal conversion apparatus which is capable of converting a video signal of an NTSC method into a video signal of a PAL method and that of an SECAM method. Also in this signal conversion apparatus shown in FIG. 7, components which are constructed similarly to those of the signal conversion apparatus described with reference to FIG. 3 are given the same reference numerals, and accordingly, descriptions thereof have been omitted.

As shown in FIG. 7, the signal conversion apparatus of this example comprises an input terminal 11 for a video signal; a switching circuit 14; an output terminal 15; a display information generation section 16; an LCD driver 17; an LCD 18; a control section 19; a D/A conversion circuit 51; a signal conversion circuit 52; an A/D conversion circuit 53; and an additional information detection/determination section 54.

In this example, as shown in FIG. 7, the D/A conversion circuit 51 and the A/D conversion circuit 53 are provided, and when receiving a digital video signal of an NTSC method, this signal is converted into an analog video signal. After this signal is converted into a video signal of a PAL method or a video signal of an SECAM method, this signal is further converted into a digital signal and is output.

The signal conversion circuit 52 of the signal conversion apparatus of this example comprises switching circuits 521 and 524; an NTSC/PAL conversion section 522 for converting an analog video signal of an NTSC method into an analog video signal of a PAL method; and an NTSC/SECAM conversion section 523 for converting an analog video signal of an NTSC method into an analog video signal of an SECAM method. The switching circuits 521 and 524 are switched in accordance with a control signal from the control section 19 in response to a selection input from a user in a manner similar to the switching circuits 121 and 124 of the signal conversion section 12 described with reference to FIG. 3.

When the switching circuits 521 and 524 are switched to the NTSC/PAL conversion section 522 side, a video signal of an NTSC method, which is input through the input terminal 1 and which is converted into an analog video signal by the D/A conversion circuit 51, is supplied to the NTSC/PAL conversion section 522 through the switching circuit 521.

As was also described above, the NTSC/PAL conversion section 522 converts a video signal of an NTSC method into a video signal of a PAL method and supplies this signal to the switching circuit 14 through the switching circuit 524.

Furthermore, when the switching circuits 521 and 524 are switched to the NTSC/SECAM conversion section 523 side, a video signal of an NTSC method, which is input through the input terminal 1 and which is converted into an analog video signal by the D/A conversion circuit 51, is supplied to the NTSC/SECAM conversion section 523 through the switching circuit 521.

As was also described above, the NTSC/SECAM conversion section 523 converts a video signal of an NTSC method into a video signal of an SECAM method and supplies this signal to the switching circuit 14 through the switching circuit 524.

In the meantime, the additional information detection/determination section 54 detects each of a plurality of additional pieces of information superposed on or added to the supplied video signal and controls the output of the video signal after signal conversion in accordance with the detected additional information in a manner similar to the case of the monitor receiver described with reference to FIG. 1.

In this example, the additional information detection/determination section 54 comprises a digital watermark information detection section, a CGMS-D detection section, and an output condition determination section. Here, the CGMS-D indicates a copy generation limitation method of a CGMS method for a digital video signal, and a CGMS-D detection section detects 2-bit CDMS information added to an area separated from the video data of the supplied digital video signal.

Then, the additional information detection/determination section 54 determines whether or not the video signal after signal conversion can be output on the basis of the detected additional information, forms a switching control signal for controlling the switching circuit 14 according to this determination result, and supplies this signal to the switching circuit 14. That is, also in this example, the switching circuit 14 is switched in accordance with a switching control signal from the additional information detection/determination section 54.

When a video signal of an NTSC method is converted into a video signal of a PAL method or when a video signal of an NTSC method is converted into a video signal of an SECAM method, the additional information superposed on or added to the video signal before signal conversion may be lost or deteriorated.

However, also in this example, since the output of the video signal after signal conversion is controlled on the basis of the additional information added to the video signal before signal conversion, it is possible to reliably protect the copyright of the video signal supplied to this signal conversion apparatus.

In the case of this example, when additional information for prohibiting or limiting copying has not been superposed on nor added to the video signal before signal conversion, since the switching circuit 14 is turned on in accordance with a switching control signal from the additional information detection/determination section 54, the signal-converted analog video signal is supplied to the A/D conversion circuit 53 whereby the signal is converted into a digital video signal and is output.

In a manner as described above, in the case of this example, signal conversion from a digital signal into an analog signal, and signal conversion from an analog signal into a digital signal, are performed. Since the control of the output of the video signal is performed in accordance with the additional information added to the video signal before signal conversion, it is possible to reliably protect the copyright of the digital signal which is supplied to this signal conversion apparatus and which is output after being signal-converted.

Furthermore, when the supplied digital signal is signal-converted into an analog signal and is output, and also, when the supplied analog signal is converted into a digital signal and is output, the control of the output of the video signal can be performed on the basis of the additional information added to the video signal before signal conversion. This makes it possible to reliably protect the copyright of the video signal which is supplied to the signal conversion apparatus and which is output after being signal-converted.

Furthermore, in this example, a description has been given assuming that a video signal of an NTSC method is converted into a video signal of a PAL method and that of an SECAM method. In addition, when a video signal of a PAL method or that of an SECAM method are converted into a video signal of an NTSC method, it is similarly possible to protect the copyright of a video signal which is input and signal-converted.

[④ Signal Conversion Apparatus for Converting a Compression Method for Digital Video Signal]

Figure 8:
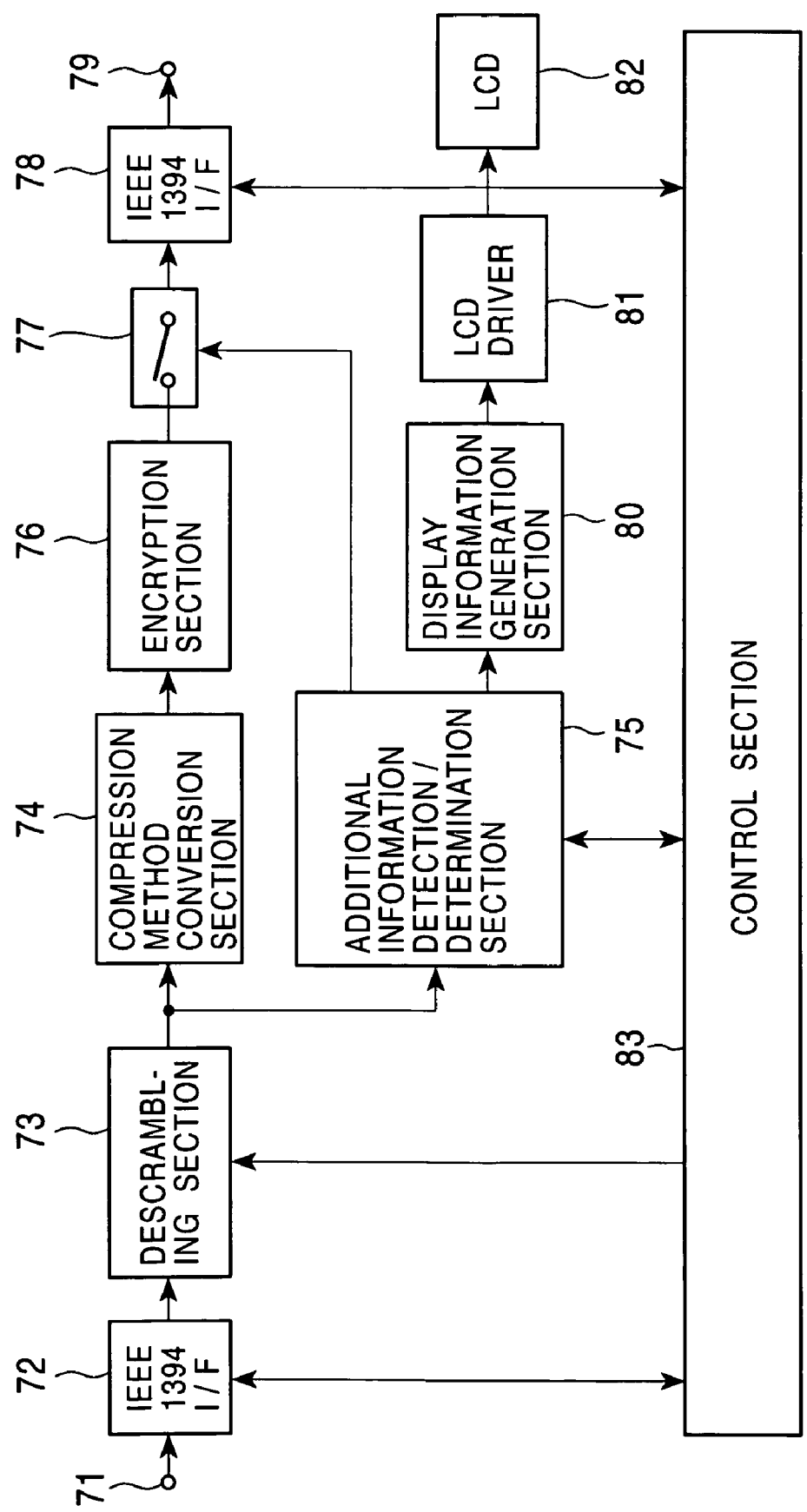
FIG. 8 is a block diagram illustrating another example of a signal conversion apparatus of the present invention.

FIG. 8 is a block diagram illustrating a signal conversion apparatus for converting a compression method for a supplied digital video signal. In this example, a description is given assuming that the signal conversion apparatus shown in FIG. 8 converts a digital video signal which is data-compressed by an MPEG method into a digital video signal which is data-compressed by a moving-picture compression method of what is commonly called a "VD method".

As shown in FIG. 8, the signal conversion apparatus of this example comprises an input terminal 71 for digital watermark information; IEEE1394 interfaces 72 and 78; a descrambling section 73; a compression-method conversion section 74; an additional information detection/determination section 75; an encryption section 76; a switching circuit 77; an output terminal 79 for a digital video signal; a display information generation section 80; an LCD driver 81; an LCD 82; and a control section 83.

The digital video signal which is data-compressed by an MPEG method, which is input through the IEEE1394 interface 72, is supplied to the descrambling section 73. The descrambling section 73 performs a descrambling process for descrambling the scrambling applied to the supplied digital video signal.

The descrambled digital video signal is supplied to the compression-method conversion section 74 and the additional information detection/determination section 75. As was also described above, in this example, the compression conversion section 74 converts a digital video signal which is data-compressed by the MPEG method into a digital video signal which is data-compressed by the VD method. The digital video signal after signal conversion in which the compression method is converted is supplied to the encryption section 76 whereby an encryption process (scrambling process) is performed, and the scrambled digital video signal is supplied to the switching circuit 77.

In the meantime, in a manner similar to the case of the monitor receiver described with reference to FIG. 1, the additional information detection/determination section 75 detects each of a plurality of additional pieces of information superposed on or added to the supplied video signal, and controls the output of the video signal after signal conversion on the basis of the detected additional information.

In this example, the additional information detection/determination section 75 comprises a digital watermark information detection section, a CGMS-D detection section, and an output condition determination section. As was also described above, the CGMS-D detection section detects 2-bit CDMS information which is added to the supplied digital video signal, which information is added to an area separated from the video signal.

Then, the additional information detection/determination section 75 determines whether or not the video signal after signal conversion can be output on the basis of the detected additional information, forms a switching control signal for controlling the switching circuit 77 on the basis of this determination result, and supplies this signal to the switching circuit 77. That is, also in this example, the switching circuit 77 is switched in accordance with a switching control signal from the additional information detection/determination section 75.

As a result, when the additional information for prohibiting copying has not been superposed on nor added to the video signal before signal conversion, the switching circuit 77 is turned on, and therefore, the digital video signal after signal conversion, which is scrambled in the encryption section 76, is output through the IEEE1394 interface 78 and the output terminal 79.

Also, when the additional information for prohibiting copying has been superposed on or added to the video signal before signal conversion, the switching circuit 77 is turned off, and therefore, the digital video signal after signal conversion, which is scrambled in the encryption section 76, is not output through the signal conversion apparatus of this example.

In the interface of the IEEE1394 standard, a scrambling process is performed on transmission digital information in order to prevent illegal copying in a manner as described above. A check is made to determine whether or not the output destination is an apparatus supporting a copy generation limitation process (compliant apparatus) based on the digital video signal and the CGMS information or the output destination is an apparatus which does not support a copy generation limitation process (non-compliant apparatus), and the CGMS information and the digital watermark information, which are information for copying control, are checked. Based on these checked results, it is determined whether or not a key for decrypting the encryption should be sent to the output destination.

The above communication control method is called an "IEEE1394 secure bus", and this makes it possible for the digital interface to effectively prevent copying.

Accordingly, when the function of this secure bus is used, and for example, a key for decrypting the encryption is not transmitted to this signal conversion apparatus shown in FIG. 8 from the apparatus of the supply source for the input video signal, or when the apparatus of the other party to which a video signal is supplied from this signal conversion apparatus shown in FIG. 8 is a non-compliant apparatus, this fact is notified to the output condition determination section of the additional information detection/determination section 75 from the control section 83.

Then, when a key for decrypting the encryption is not transmitted or when the apparatus of the other party is a non-compliant apparatus, the output condition determination section of the additional information detection/determination section 75 forms a switching control signal for turning off the switching circuit 77 and supplies this signal to the switching circuit 77.

As a result, regardless of the additional information superposed on or added to the supplied digital video signal before signal conversion, when a key for decrypting the encryption is not transmitted or when the apparatus of the other party is a non-compliant apparatus, it is also possible to prevent a digital information signal from being output from this signal conversion apparatus shown in FIG. 8.

In a manner as described above, since the signal conversion apparatus of this example is capable of controlling the output of the video signal after signal conversion on the basis of the additional information superposed on or added to the video signal before signal conversion, it is possible to reliably protect the copyright of the video signal supplied to the signal conversion apparatus of this example.

Also, when a key for decrypting the encryption is not transmitted or when the apparatus of the other party is a non-compliant apparatus, by assuming the information supplied to the additional information detection/determination section, obtained by the function of the secure bus, to be information equivalent to the additional information added to the input digital video signal, it is possible to control the switching circuit 77 by also taking into consideration the information obtained by the function of this secure bus.

Also in this example, the additional information detection/determination section 75 is capable of notifying the user of the state of the output control of the video signal after signal conversion through the display information generation section 80, the LCD driver 81, and the LCD 82.

Figure 9:
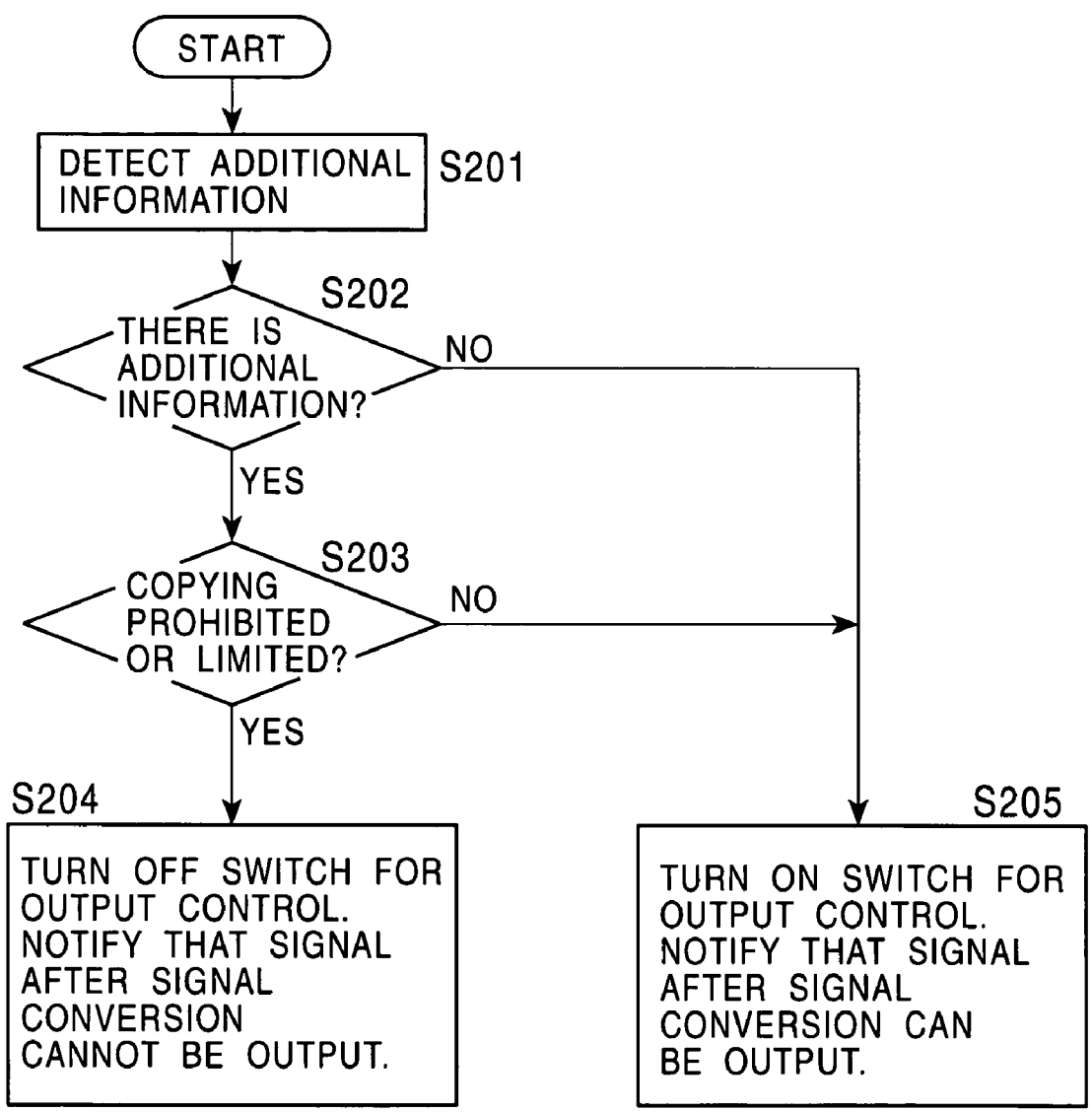
FIG. 9 is a flowchart illustrating an output control process for a signal after signal conversion, which is performed by an additional information detection/determination section of the signal conversion apparatus shown in FIGS. 7 and 8.

Next, referring to the flowchart in FIG. 9, a description is given of the operation of the additional information detection/determination sections 54 and 75 of the signal conversion apparatus described with reference to FIGS. 7 and 8. When the power of the signal conversion apparatus is switched on and a digital video signal is input through the input terminals 11 and 71, a digital video signal is also supplied to the additional information detection/determination sections 54 and 75, and in response, a process for detecting the additional information superposed on or added to this digital video signal is performed (step S201).

Then, the additional information detection/determination sections 54 and 75 determine whether or not the additional information has been detected on the basis of the supplied digital video signal (step S202). When it is determined in the determination process of step S202 that the additional information has been detected, it is determined whether or not the detected additional information indicates copy prohibition (step S203).

When it is determined in the determination process of step S203 that the detected additional information indicates copy prohibition, the additional information detection/determination sections 54 and 75 control the switching circuits 14 and 77 used for output control so as to be turned off, and notify the user that the video signal after conversion cannot be output through the LCDs 18 and 82 (step S204).

Also, when it is determined in the determination process of step S202 that the additional information has not been detected, or when it is determined in the determination process of step S203 that the detected additional information does not indicate copy prohibition, the additional information detection/determination sections 54 and 75 control the switching circuits 14 and 77 used for output control so as to be turned on, and notify the user that the video signal after conversion can be output through the LCDs 18 and 82 (step S205).

In a manner as described above, when the digital signal supplied to the signal conversion apparatus is signal-converted and is output, it is possible to control the output of the signal after signal conversion on the basis of the additional information added to the supplied signal, that is, the signal before signal conversion. As a result, it is possible to reliably and appropriately protect the copyright of the digital signal which is signal-converted and output by the signal conversion apparatus.

Third Embodiment

Figure 10:
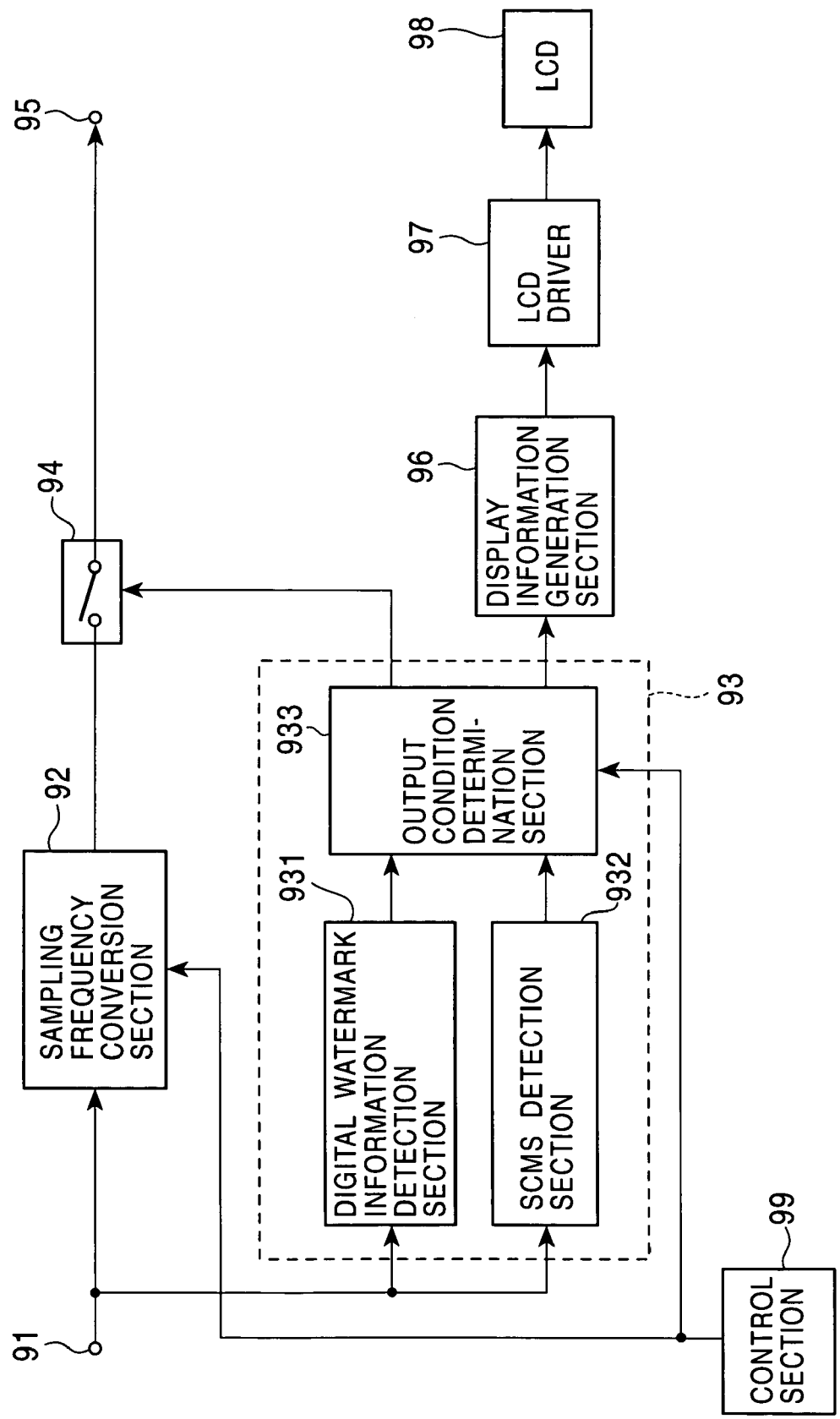
FIG. 10 is a block diagram illustrating another example of a signal conversion apparatus of the present invention.

FIG. 10 is a block diagram illustrating a signal conversion apparatus for an audio signal according to a third embodiment for converting an audio signal and outputting it. The signal conversion apparatus of this third embodiment is capable of converting the sampling frequency of an input audio signal.

A description is given assuming that digital watermark information is superposed, as additional information, on an audio signal input to the signal conversion apparatus of this third embodiment, and further, additional information of an SCMS method (hereinafter referred to as "SCMS information") is added to the audio signal.

As shown in FIG. 10, the signal conversion apparatus of this third embodiment comprises an input terminal 91; a sampling frequency conversion section 92 as a signal conversion section; an additional information detection/determination section 93; a switching circuit 94; a display information generation section 95; an LCD driver 97; an LCD 98; and a control section 99.

The control section 99 is a microcomputer comprising a CPU, a ROM, and a RAM, and controls each section of the signal conversion apparatus of this third embodiment. The control section 99 notifies the sampling frequency of an audio signal to the sampling frequency conversion section 92 in response to a selection input of the sampling frequency from a user through a key operation section (not shown), and further notifies the sampling frequency to the additional information detection/determination section 93.

Then, the audio signal input through the input terminal 91 is supplied to the sampling frequency conversion section 92 and the additional information detection/determination section 93. In this third embodiment, the sampling frequency conversion section 92 performs signal conversion for converting the sampling frequency of the supplied audio signal on the basis of the notification information of the sampling frequency from the control section 99 and supplies the audio signal after signal conversion to the switching circuit 94.

The sampling frequency conversion section 92 of this third embodiment is capable of converting the sampling frequency of the input audio signal into various sampling frequencies, such as 8 kHz, 11 kHz, 22 kHz, 32 kHz, 44.1 kHz, 48 kHz, 96 kHz, 128 kHz, etc., on the basis of the notification input from the user.

As shown in FIG. 10, the additional information detection/determination section 93 comprises a digital watermark information detection section 931, an SCMS detection section 932, and an output condition determination section 933. In the digital watermark information detection section 931, digital watermark information which is superposed on the audio signal before the sampling frequency is converted is detected from the audio signal, and the detection result is supplied to the output condition determination section 933. Also, the SCMS detection section detects SCMS information from the audio signal before the sampling frequency is converted and supplies the detection result to the output condition determination section 933.

The output condition determination section 933 forms a switching control signal for controlling the switching of the switching circuit 94 for controlling the output of the audio signal after signal conversion on the basis of the detection result from the digital watermark information detection section 931 and the SCMS detection section 932 and on the basis of the sampling frequency of the audio signal after signal conversion from the control section 99, and supplies this signal to the switching circuit 94.

In this third embodiment, the output condition determination section 933 forms a switching control signal for turning off the switching circuit 94 when one of the digital watermark information and the SCMS information indicates copy prohibition of the audio signal and when the sampling frequency of the audio signal after signal conversion is 44.1 kHz.

Also, the output condition determination section 933 forms a switching control signal for turning on the switching circuit 94 when the sampling frequency of the audio signal after signal conversion is not 44.1 kHz, or when the digital watermark information does not indicate copy prohibition, or when there is no digital watermark information and the SCMS information does not indicate copy prohibition.

In a manner as described above, the reason even the sampling frequency of the audio signal after signal conversion is made to be a condition for the control of the output of the signal after signal conversion is to reliably prevent a high-quality audio signal from being illegally copied by a recording and playback apparatus (hereinafter referred to as an "MD apparatus") in which a small magneto-optic disk called an MD (Minidisk) is used as a recording medium.

More specifically, the sampling frequency of the audio signal of the MD apparatus is 44.1 kHz, and in the case of a sampling frequency other than this frequency, output of an audio signal after signal conversion from this signal conversion apparatus shown in FIG. 10 is made possible.

As a result, when additional information indicating copy prohibition is superposed on or added to the audio signal before signal conversion and when the digital audio signal of 44.1 kHz is not output, the signal conversion apparatus of this third embodiment is capable of reliably and appropriately protecting the copyright of the audio signal which is supplied to this signal conversion apparatus whereby the signal is converted.

Figure 11:
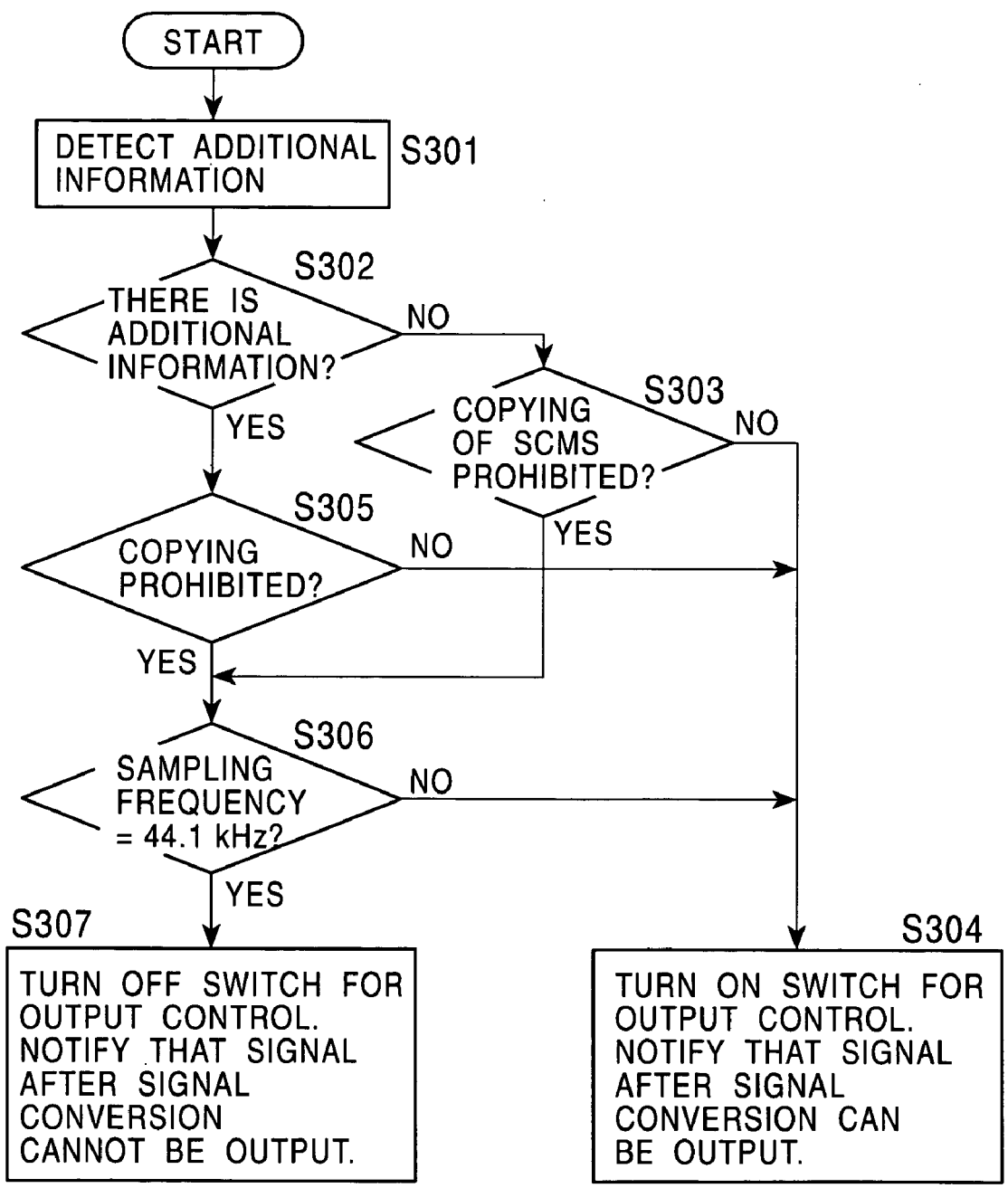
FIG. 11 is a flowchart illustrating an output control process for a signal after signal conversion, which is performed by an additional information detection/determination section of the signal conversion apparatus shown in FIG. 10.

Next, referring to the flowchart in FIG. 11, control of the output of an audio signal which is signal-converted and formed, which is performed in the signal conversion apparatus of this third embodiment, is described with emphasis on the additional information detection/determination section 93.

When the power of the signal conversion apparatus of this third embodiment is switched on, a selection input of a sampling frequency is made by a user, and an audio signal is supplied through the input terminal 91, a process shown in the flowchart in FIG. 11 is performed in the additional information detection/determination section 93.

Initially, detection of the digital watermark information and the SCMS information is performed by the digital watermark information detection section 931 and the SCMS detection section 932 of the additional information detection/determination section 93 (step S301), and the detection result is supplied to the output condition determination section 933.

The output condition determination section 933 determines whether or not the digital watermark information has been detected on the basis of the detection result from the digital watermark information detection section 931 (step S302). When it is determined in the determination process of step S302 that the digital watermark information has not been detected, the output condition determination section 933 determines whether or not the SCMS information added to the audio signal indicates copy prohibition (step S303).

When it is determined in the determination process of step S303 that the SCMS information does not indicate copy prohibition, an output condition determination section 944 controls the switching circuit 94 so as to be turned on so that the audio signal after signal conversion is output through the output terminal 95 and the fact that the audio signal after signal conversion can be output is notified through the LCD 98 (step S304).

When it is determined in the determination process of step S302 that the digital watermark information has been detected, it is determined whether or not the detected digital watermark information indicates copy prohibition (step S305). When it is determined in the determination process of step S305 that the digital watermark information indicates copy prohibition, or when it is determined in the determination process of step S303 that the SCMS information added to the audio signal indicates copy prohibition, the output condition determination section 933 determines whether or not the sampling frequency of the audio signal after signal conversion is 44.1 kHz on the basis of the information indicating the sampling frequency from the control section 99 (step S306).

When it is determined in the determination process of step S306 that the sampling frequency of the audio signal after signal conversion is 44.1 kHz, the switch 94 is turned off so that the audio signal after signal conversion is not output, and further, the fact that the audio signal after signal conversion cannot be output is notified through the LCD 98 (step S307).

Furthermore, when it is determined in the determination process of step S305 that the detected digital watermark information does not indicate copy prohibition and when it is determined in the determination process of step S306 that the information of the sampling frequency from the control section 99 is not 44.1 kHz, it is determined that the audio signal after signal conversion whose sampling frequency has been converted can be output, and the process of step S304 is performed. That is, the switching circuit 94 is turned on so that the audio signal after signal conversion is output through the output terminal 95, and the fact that the audio signal after signal conversion can be output is notified to the user through the LCD 98.

In a manner as described above, the signal conversion apparatus of this third embodiment performs signal conversion such that the sampling frequency is changed. When the additional information superposed on or added to the audio signal after signal conversion indicates copy prohibition and when the sampling frequency of the audio signal after signal conversion is 44.1 kHz, the signal is not output from this signal conversion apparatus. This makes it possible to prevent the audio signal whose copying is prohibited from being digitally recorded on an MD (Minidisk).

In this third embodiment, a description has been given by using, as an example, a case in which the sampling frequency of an audio signal is converted; however, the signal conversion is not limited to this example. For example, the signal conversion apparatus and the signal conversion method according to the present invention can be applied to a case in which various signal conversions, such as an analog audio signal being converted into a digital audio signal, a compression method for a digital audio signal being converted, or the number of bits of a digital audio signal being converted, are performed.

The signal conversion apparatus and the signal conversion method according to the present invention are not simply applied to a signal conversion apparatus. As in the above-described first embodiment, the signal conversion apparatus and the signal conversion method can be applied to various apparatuses, such as a monitor receiver, a receiver for a digital broadcasting called an STB (set top box), a playback apparatus, a recording apparatus, a communication apparatus, etc.

More specifically, the signal conversion apparatus and the signal conversion method according to the present invention can be applied to various apparatuses for receiving an information signal, converting this signal, and outputting it, to various playback apparatuses for reading an information signal recorded on a recording medium, converting this signal, and outputting it, and to various recording apparatuses for receiving an information signal, converting this signal, and recording it on a recording medium.

Furthermore, the additional information added to the input signal is not limited to digital watermark information, CGMS information, a pseudo-synchronization signal for copy prevention, or SCMS information, which are described above. For example, various types of additional pieces of information used to prohibit or limit copying, for example, additional information of an XDS method added in a horizontal interval in the 21st line of a vertical blanking period, may be used. In this case, a detection section for detecting target additional information may be provided in the additional information detection/determination section. It is a matter of course that detection sections need not to be provided for all the above-described additional information, and that only detection sections for required additional information may be provided.

In the above-described embodiments, when the copying of the input signal is prohibited or limited, the signal after signal conversion is not output, but this is not so limited. For example, when the input signal is a video signal, a display message, such as "copying is prohibited", may be displayed on the entire surface of the display image by superimposition so that the signal is output in such a way that it cannot be used normally.

Furthermore, also when the input signal is an audio signal, noise may be mixed therein so that the signal is output in such a way that it cannot be used normally. That is, when the copying of the input signal is prohibited or limited, the signal after signal conversion need only to be such that it cannot be used normally.

Although in the above-described embodiments the output control state of the signal after signal conversion is notified to the user by displaying a message on an LCD, this is not so limited.

For example, when the input signal is such that additional information for copy prohibition has been added and the signal after signal conversion cannot be output, an LED (light-emitting diode) for red color may be switched on or may flash, and when, in contrast, the signal after signal conversion can be output, the LED may be switched on or may flash green, so that the output control state of the signal after signal conversion is notified to the user.

Although in the above-described embodiments a case is used, as an example, in which a video signal or an audio signal is an input signal, the input signal is not limited to this example. Of course, for example, various data, such as text data, or programs, may be used.

Furthermore, signal conversion is not limited to those described in the above-described embodiments. For example, in the case of a video signal, the signal conversion apparatus and the signal conversion method according to the present invention can be applied to a case in which a three-primary-color signal (RGB signal) is converted into a video signal of an NTSC method or into a luminance signal and color-difference signals and to a case in which various signal conversions, such as conversion of the number of bits of a digital video signal, or conversion of a communication protocol of transmission data, are performed.

As has been described up to this point, according to the signal conversion apparatus of the present invention, since use limitation of a signal after signal conversion is appropriately performed on the basis of additional information added to an input signal, it is possible to appropriately protect the copyright of the signal to be signal-converted.

According to the signal conversion apparatus of the present invention, even if a scanning method for an input video signal is converted, since use limitation of a signal after signal conversion is appropriately performed on the basis of additional information added to a video signal before signal conversion, it is possible to appropriately protect the copyright of the video signal to be signal-converted.

According to the signal conversion apparatus of the present invention, even if an input video signal is converted into a video signal having a different number of scanning lines by performing interpolation or thinning of scanning lines, since use limitation of the video signal after signal conversion is appropriately performed on the basis of additional information added to the video signal before signal conversion, it is possible to appropriately protect the copyright of the video signal to be signal-converted.

According to the signal conversion apparatus of the present invention, even when the format of an input video signal is converted and the signal is output, since use limitation of a video signal after signal conversion is appropriately performed on the basis of additional information added to the input video signal before signal conversion, it is possible to appropriately protect the copyright of the video signal to be signal-converted.

According to the signal conversion apparatus of the present invention, since use limitation of an audio signal after signal conversion is appropriately performed on the basis of additional information added to an input audio signal, it is possible to appropriately protect the copyright of the audio signal to be signal-converted.

According to the signal conversion apparatus of the present invention, when the signal after signal conversion is not output, the reason the signal is not output can be notified to the user of the signal conversion apparatus, making it possible to quickly notify the reason the signal after signal conversion is not output. Also, when the signal after signal conversion is not output, it is possible for the user not to misunderstand this as a failure of the apparatus.

According to the signal conversion apparatus of the present invention, it is possible to reliably and accurately protect the copyright of the input signal by superposing digital watermark information which is difficult to remove or counterfeit onto an input signal.

According to the signal conversion apparatus of the present invention, it is possible to accurately and appropriately protect the copyright of the input digital signal which is to be signal-converted by using additional information added to the digital signal.

According to the signal conversion apparatus of the present invention, even when one piece of additional information is illegally removed or counterfeited, it is possible to reliably and appropriately perform the control of the output of a signal after signal conversion. Therefore, it is possible to improve the reliability with respect to the control of the output of the signal after signal conversion.

According to the signal conversion apparatus of the present invention, since it is difficult to remove or counterfeit digital watermark information, even when additional information other than digital watermark information is illegally removed or counterfeited, the digital watermark information remains superposed on the input signal. Therefore, by using this digital watermark information, it is possible to reliably and accurately perform the control of the output of the signal after signal conversion.

According to the signal conversion apparatus of the present invention, the control of the output of a signal after signal conversion can be accurately performed by, for example, CGMS information added to the input digital signal, and the control of the output of the signal after signal conversion can be performed by the presence or absence of key information for decrypting encryption and by the type of an apparatus of the destination to which the signal after signal conversion is provided.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. A signal conversion apparatus, comprising:
    signal conversion means for converting an input signal to said apparatus to a converted signal;
    determination means for examining said input signal for additional information added to said input signal indicating that copying of said input signal is limited but not prohibited;
    prohibiting means for prohibiting said converted signal from being copied when said additional information is present on said input signal; and
    notification means for notifying a user of said apparatus of said prohibiting of said converted signal.

2. A signal conversion apparatus according to claim 1, wherein said input signal is a video signal, and said signal conversion means is adapted to perform a signal conversion process on said video signal selected from the group consisting of converting progressive scanning into interlaced scanning and converting interlaced scanning into progressive scanning.

3. A signal conversion apparatus according to claim 1, wherein said input signal is a video signal, and said signal conversion means is adapted to convert the number of scanning lines of said video signal.

4. A signal conversion apparatus according to claim 1, wherein said input signal is a video signal, and said signal conversion means is adapted to convert a signal format of said video signal.

5. A signal conversion apparatus according to claim 4, wherein said signal format conversion is selected from the group consisting of converting a high-definition television signal into a standard television signal and converting a standard television signal into a high-definition television signal.

6. A signal conversion apparatus according to claim 4, wherein said signal format conversion is selected from the group consisting of converting a video signal of image data in a format for computer processing into a high-definition television signal, converting a video signal of image data in a format for computer processing into a standard television signal, converting a high-definition television signal into a video signal of image data in a format for computer processing, and converting a standard television signal into a video signal of image data in a format for computer processing.

7. A signal conversion apparatus according to claim 4, wherein said video signal is an analog video signal and said signal conversion means is adapted to convert said analog video signal into a digital video signal.

8. A signal conversion apparatus according to claim 4, wherein said signal conversion means is adapted to convert a data compression method of said video signal.

9. A signal conversion apparatus according to claim 1, wherein said input signal is an audio signal.

10. A signal conversion apparatus according to claim 9, wherein said signal conversion means is adapted to convert a sampling frequency of said audio signal.

11. A signal conversion apparatus according to claim 9, wherein said signal conversion means is adapted to convert a data compression method for said audio signal.

12. A signal conversion apparatus according to claim 9, wherein said audio signal is an analog audio signal and said signal conversion means is adapted to convert said analog audio signal into a digital audio signal.

13. A signal conversion apparatus according to claim 1, wherein said additional information is digital watermark information.

14. A signal conversion apparatus according to claim 1, wherein said input signal is a digital signal.

15. A signal conversion apparatus according to claim 1, wherein said additional information comprises a plurality of different types of information.

16. A signal conversion apparatus according to claim 15, wherein one of said plurality of different types of information is digital watermark information.

17. A signal conversion apparatus according to claim 1, wherein said input signal is a digital signal that is encrypted.

18. A signal conversion apparatus according to claim 1, wherein said prohibiting means prohibits said converted signal from being transmitted as an output signal from said conversion apparatus.

19. A signal conversion method, comprising the steps of:
    converting within an apparatus an input signal to said apparatus to a converted signal;
    examining said input signal for additional information added to said input signal;
    determining whether or not said additional information indicates that copying of said input signal is limited but not prohibited;

prohibiting the copying of said converted signal when said use limitation indicates that copying of said input signal is limited but not prohibited; and notifying a user of said apparatus of said prohibiting for said converted signal.

20. A signal conversion method according to claim 19, wherein said input signal is a video signal, and said signal converting step performs a signal conversion process on said video signal selected from the group consisting of converting progressive scanning into interlaced scanning and converting interlaced scanning into progressive scanning.

21. A signal conversion method according to claim 19, wherein said input signal is a video signal, and said signal converting step converts the number of scanning lines of said video signal.

22. A signal conversion method according to claim 19, wherein said input signal is a video signal, and said signal converting step converts a signal format of said video signal.

23. A signal conversion method according to claim 22, wherein said signal format conversion is selected from the group consisting of converting a high-definition television signal into a standard television signal and converting a standard television signal into a high-definition television signal.

24. A signal conversion method according to claim 22, wherein said signal format conversion is selected from the group consisting of converting a video signal of image data in a format for computer processing into a high-definition television signal, converting a video signal of image data in a format for computer processing into a standard television signal, converting a high-definition television signal into a video signal of image data in a format for computer processing, and converting a standard television signal into a video signal of image data in a format for computer processing.

25. A signal conversion method according to claim 22, wherein said video signal is an analog video signal and said signal converting step converts said analog video signal into a digital video signal.

26. A signal conversion method according to claim 22, wherein said signal converting step converts a data compression method of said video signal.

27. A signal conversion method according to claim 19, wherein said input signal is an audio signal.

28. A signal conversion method according to claim 27, wherein said signal converting step converts a sampling frequency of said audio signal.

29. A signal conversion method according to claim 27, wherein said signal converting step converts a data compression method for said audio signal.

30. A signal conversion method according to claim 27, wherein said audio signal is an analog audio signal and said signal converting step converts said analog audio signal into a digital audio signal.

31. A signal conversion method according to claim 19, wherein said additional information is digital watermark information.

32. A signal conversion method according to claim 19, wherein said input signal is a digital signal.

33. A signal conversion method according to claim 19, wherein said additional information comprises a plurality of different types of information.

34. A signal conversion method according to claim 33, wherein one of said plurality of different types of information is digital watermark information.

35. A signal conversion method according to claim 19, wherein said input signal is a digital signal that is encrypted.

36. A signal conversion method according to claim 19, further comprising prohibiting said converted signal from being transmitted as an output signal.

37. A signal conversion apparatus, comprising:

a signal converter adapted to convert an input signal to said apparatus into a converted signal;

a signal detector adapted to examine said input signal to detect additional information added to said input signal and determine whether said additional information indicates that copying of said input signal is limited but not prohibited;

a switch for prohibiting the copying of said converted signal when said additional information indicates that copying of said input signal is limited but not prohibited; and a visual indicator adapted to notify a user of said apparatus of said prohibiting of said converted signal.

38. A signal conversion apparatus according to claim 37, wherein said input signal is a video signal, and said signal converter is adapted to perform a signal conversion process on said video signal selected from the group consisting of converting progressive scanning into interlaced scanning and converting interlaced scanning into progressive scanning.

39. A signal conversion apparatus according to claim 37, wherein said input signal is a video signal, and said signal converter is adapted to convert the number of scanning lines of said video signal.

40. A signal conversion apparatus according to claim 37, wherein said input signal is a video signal, and said signal converter is adapted to convert a signal format of said video signal.

41. A signal conversion apparatus according to claim 40, wherein said signal format conversion is selected from the group consisting of converting a high-definition television signal into a standard television signal and converting a standard television signal into a high-definition television signal.

42. A signal conversion apparatus according to claim 40, wherein said signal format conversion is selected from the group consisting of converting a video signal of image data in a format for computer processing into a high-definition television signal, converting a video signal of image data in a format for computer processing into a standard television signal, converting a high-definition television signal into a video signal of image data in a format for computer processing, and converting a standard television signal into a video signal of image data in a format for computer processing.

43. A signal conversion apparatus according to claim 40, wherein said video signal is an analog video signal and said signal converter is adapted to convert said analog video signal into a digital video signal.

44. A signal conversion apparatus according to claim 40, wherein said signal converter is adapted to convert a data compression method of said video signal.

45. A signal conversion apparatus according to claim 37, wherein said input signal is an audio signal.

46. A signal conversion apparatus according to claim 45, wherein said signal converter is adapted to convert a sampling frequency of said audio signal.

47. A signal conversion apparatus according to claim 45, wherein said signal converter is adapted to convert a data compression method for said audio signal.

48. A signal conversion apparatus according to claim 45, wherein said audio signal is an analog audio signal and said signal converter is adapted to convert said analog audio signal into a digital audio signal.

49. A signal conversion apparatus according to claim 37, wherein said additional information is digital watermark information.

50. A signal conversion apparatus according to claim 37, wherein said input signal is a digital signal.

51. A signal conversion apparatus according to claim 37, wherein said additional information comprises a plurality of different types of information.

52. A signal conversion apparatus according to claim 51, wherein one of said plurality of different types of information is digital watermark information.

53. A signal conversion apparatus according to claim 37, wherein said input signal is a digital signal that is encrypted.

54. A signal conversion apparatus according to claim 37, wherein said switch prohibits said converted signal from being transmitted as an output signal from said signal conversion apparatus.

\* \* \* \* \*